United States Patent
Hatta et al.

(10) Patent No.: US 10,270,128 B2
(45) Date of Patent: Apr. 23, 2019

(54) BATTERY, ELECTROLYTE, BATTERY PACK, ELECTRONIC DEVICE, ELECTRIC VEHICLE, POWER STORAGE DEVICE, AND POWER SYSTEM

(71) Applicant: Sony Corporation, Tokyo (JP)

(72) Inventors: Kazuhito Hatta, Fukushima (JP); Keiichi Kagami, Fukushima (JP); Nobuaki Shimosaka, Fukushima (JP); Keizo Koga, Fukushima (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 278 days.

(21) Appl. No.: 15/026,483

(22) PCT Filed: Oct. 16, 2014

(86) PCT No.: PCT/JP2014/005256
§ 371 (c)(1),
(2) Date: Mar. 31, 2016

(87) PCT Pub. No.: WO2015/097952
PCT Pub. Date: Jul. 2, 2015

(65) Prior Publication Data
US 2016/0240887 A1    Aug. 18, 2016

(30) Foreign Application Priority Data
Dec. 27, 2013   (JP) .................... 2013-273540

(51) Int. Cl.
*H02J 7/00*       (2006.01)
*H01M 10/0565*    (2010.01)
(Continued)

(52) U.S. Cl.
CPC ..... *H01M 10/0565* (2013.01); *B60L 11/1811* (2013.01); *B60L 11/1861* (2013.01);
(Continued)

(58) Field of Classification Search
CPC .................. H01M 10/0565; B60L 11/1811
(Continued)

(56) References Cited

U.S. PATENT DOCUMENTS 8,313,853 B2 * 11/2012 Kaun ................ H01M 2/145
                                                428/293.4
9,065,118 B1 * 6/2015 Kaun ................ H01M 2/145
(Continued)

FOREIGN PATENT DOCUMENTS

CN    101814631 A    8/2010
JP    10-116513      5/1998
(Continued)

OTHER PUBLICATIONS

International Search Report issued in PCT/JP2014/005256, dated Jan. 6, 2015 (2 pages).
(Continued)

*Primary Examiner* — Suchin Parihar
(74) *Attorney, Agent, or Firm* — K&L Gates LLP

(57) ABSTRACT

A particle size D50 of the particle is not less than 50 nm and not more than 450 nm, or not less than 750 nm and not more than 10,000 nm. A refractive index of the particle is not less than 1.3 and less than 2.4. One of a mass ratio between the particles and the matrix polymer compound (particles/matrix polymer compound) and a mass ratio between the particles and the electrolyte salt (particles/electrolyte salt) is not less than 15/85 and not more than 90/10.

22 Claims, 10 Drawing Sheets

(51) Int. Cl.

| | | |
|---|---|---|
| *H01M 10/052* | (2010.01) | |
| *H01M 10/42* | (2006.01) | |
| *B60L 11/18* | (2006.01) | |
| *H01M 2/02* | (2006.01) | |
| *H01M 2/06* | (2006.01) | |
| *H01M 2/30* | (2006.01) | |
| *H01M 4/131* | (2010.01) | |
| *H01M 4/133* | (2010.01) | |
| *H01M 4/525* | (2010.01) | |
| *H01M 4/587* | (2010.01) | |
| *H01M 4/62* | (2006.01) | |
| *H01M 4/66* | (2006.01) | |
| *H01M 10/0587* | (2010.01) | |
| *H01M 10/46* | (2006.01) | |
| *H01M 10/0585* | (2010.01) | |
| *H01M 10/48* | (2006.01) | |
| *H01M 4/04* | (2006.01) | |
| *H01M 4/1391* | (2010.01) | |
| *H01M 4/1393* | (2010.01) | |
| *H01M 4/02* | (2006.01) | |

(52) U.S. Cl.
CPC ........... *H01M 2/021* (2013.01); *H01M 2/024* (2013.01); *H01M 2/06* (2013.01); *H01M 2/30* (2013.01); *H01M 2/305* (2013.01); *H01M 4/131* (2013.01); *H01M 4/133* (2013.01); *H01M 4/525* (2013.01); *H01M 4/587* (2013.01); *H01M 4/622* (2013.01); *H01M 4/623* (2013.01); *H01M 4/625* (2013.01); *H01M 4/661* (2013.01); *H01M 10/052* (2013.01); *H01M 10/0585* (2013.01); *H01M 10/0587* (2013.01); *H01M 10/4257* (2013.01); *H01M 10/46* (2013.01); *H01M 10/482* (2013.01); *H01M 10/486* (2013.01); *H01M 4/0404* (2013.01); *H01M 4/1391* (2013.01); *H01M 4/1393* (2013.01); *H01M 2004/027* (2013.01); *H01M 2004/028* (2013.01); *H01M 2010/4271* (2013.01); *H01M 2010/4278* (2013.01); *H01M 2220/20* (2013.01); *H01M 2220/30* (2013.01); *H01M 2300/004* (2013.01); *H01M 2300/0085* (2013.01); *H01M 2300/0091* (2013.01); *Y02E 60/122* (2013.01); *Y02T 10/7011* (2013.01)

(58) Field of Classification Search
USPC .......................................................... 320/106
See application file for complete search history.

(56) References Cited

U.S. PATENT DOCUMENTS

| | | | | |
|---|---|---|---|---|
| 2004/0002002 | A1* | 1/2004 | Mizuta | H01G 9/035 429/188 |
| 2008/0138704 | A1* | 6/2008 | Mizuta | H01G 9/035 429/203 |
| 2009/0181292 | A1* | 7/2009 | Kaun | H01M 2/145 429/129 |
| 2014/0353546 | A1* | 12/2014 | Watanabe | C23C 14/35 252/182.1 |
| 2017/0117583 | A1* | 4/2017 | Matsuno | H01M 10/0525 |

FOREIGN PATENT DOCUMENTS

| | | |
|---|---|---|
| JP | 2000-195491 | 7/2000 |
| JP | 2004-014373 | 1/2004 |
| JP | 2008-529209 | 7/2008 |
| JP | 2008-210541 | 9/2008 |
| JP | 2010-198757 | 9/2010 |
| JP | 2011-210433 | 10/2011 |
| JP | 2013-114764 | 6/2013 |

OTHER PUBLICATIONS

First Office Action issued in connection with Chinese Patent Application No. 201480070053.9, dated Apr. 4, 2018. (8 pages).

Search Report issued in connection with Chinese Patent Application No. 201480070053.9, dated Mar. 23, 2018. (2 pages).

Notice of reasons for refusal issued in connection with Japanese Patent Application No. 2015-554504, dated Apr. 24, 2018. (8 pages).

Japanese Office Action dated Sep. 4, 2018 in corresponding Japanese Application No. 2015-554504.

* cited by examiner

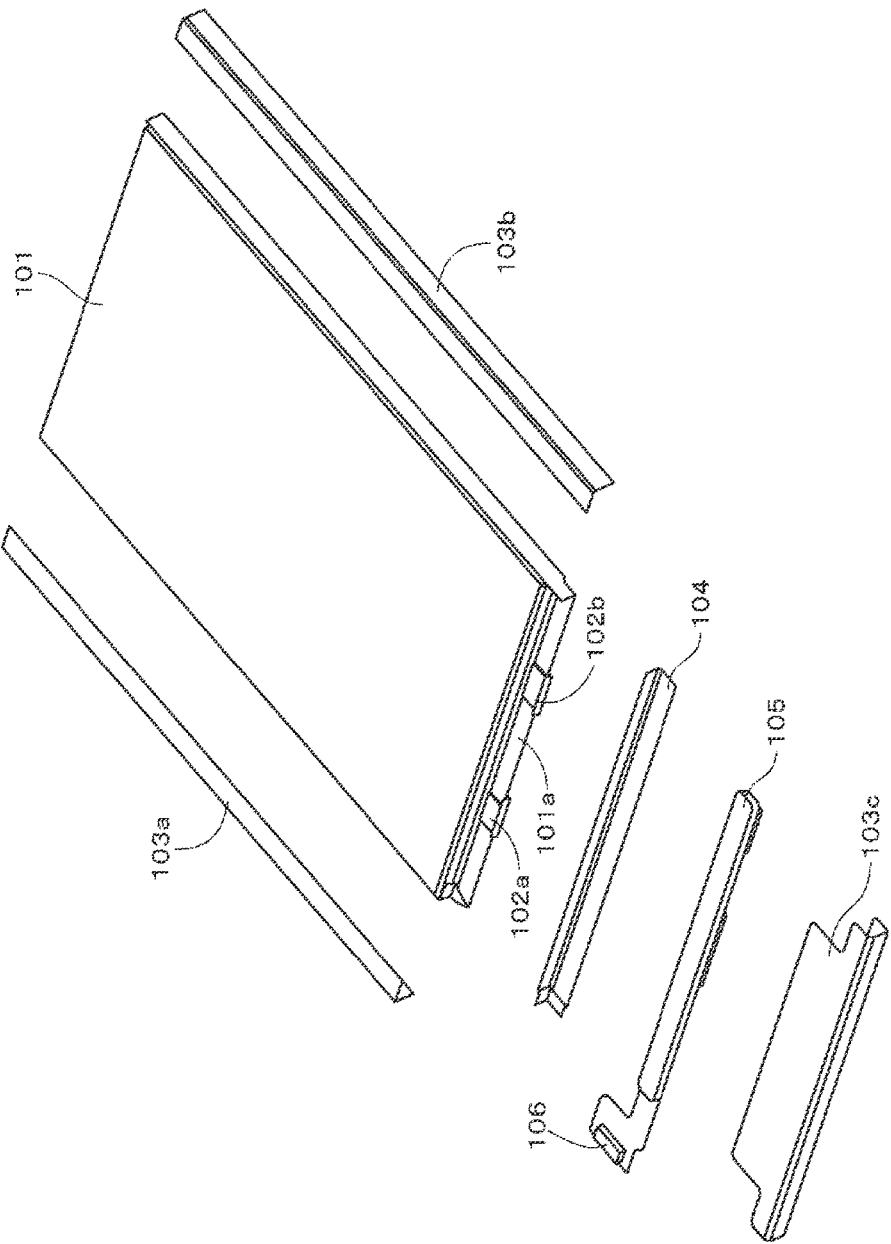

BATTERY, ELECTROLYTE, BATTERY PACK, ELECTRONIC DEVICE, ELECTRIC VEHICLE, POWER STORAGE DEVICE, AND POWER SYSTEM

This application claims the benefit of International Application PCT/JP2014/005256, filed Oct. 16, 2014, which claims priority to Japanese Priority Patent Application JP 2013-273540 filed on Dec. 27, 2013, the entire contents of which are incorporated herein by reference.

TECHNICAL FIELD

The present technology relates to a battery, an electrolyte, a battery pack, an electronic device, an electric vehicle, a power storage device, and a power system each using the battery.

BACKGROUND ART

For lithium ion secondary batteries, which are excellent in energy density and are widely used for mobile devices, those using a laminated film for the package member are put in practical use because of their lighter weight and high energy density, the manufacturability of batteries with a very thin shape, etc.

In the battery thus using a laminated film as the package member, an electrolyte solution and a polymer compound are used as the electrolyte for the purposes of resistance to liquid leakage etc., and such a battery is known as a polymer battery. Among them, a battery using a gel electrolyte in what is called a gel form in which an electrolyte solution is retained in a polymer compound is widely used.

In the polymer battery, the shape variability is greatly improved by using an aluminum laminated film for the package member, but on the other hand, the strength may be insufficient and deformation is likely to occur when strong force is applied due to misuse.

In this case, although there is no problem in the case of being covered with a strong outer pack, the outer pack is becoming simpler with the recent requirement for higher capacities, and when the deformation is large, the battery is likely to experience a short circuit inside and may not function as a battery.

In this regard, in Patent Literature 1, it is proposed to mix particles of alumina or the like in the gel electrolyte to improve the strength of the gel.

CITATION LIST

Patent Literature

Patent Literature 1: JP 2010-198757A

SUMMARY OF INVENTION

Technical Problem

In a battery in which particles are mixed in an electrolyte, it has been difficult to ensure safety without sacrificing the capacity, due to the occurrence of cloudiness or the like in the electrolyte.

Thus, an object of the present technology is to provide a battery, an electrolyte, a battery pack, an electronic device, an electric vehicle, a power storage device, and a power system in which safety can be ensured without sacrificing the capacity.

Solution to Problem

In order to solve the above problem, the present technology provides a battery including: a positive electrode; a negative electrode; a separator; and an electrolyte containing particles, an electrolyte solution containing a solvent and an electrolyte salt, and a matrix polymer compound. A particle size D50 of the particle is not less than 50 nm and not more than 450 nm, or not less than 750 nm and not more than 10,000 nm. A refractive index of the particle is not less than 1.3 and less than 2.4. One of a mass ratio between the particles and the matrix polymer compound (particles/matrix polymer compound) and a mass ratio between the particles and the electrolyte salt (particles/electrolyte salt) is not less than 15/85 and not more than 90/10.

The present technology provides an electrolyte including: particles; an electrolyte solution containing a solvent and an electrolyte salt; and a matrix polymer compound. A particle size D50 of the particle is not less than 50 nm and not more than 450 nm, or not less than 750 nm and not more than 10,000 nm. A refractive index of the particle is not less than 1.3 and less than 2.4. One of a mass ratio between the particles and the matrix polymer compound (particles/matrix polymer compound) and a mass ratio between the particles and the electrolyte salt (particles/electrolyte salt) is not less than 15/85 and not more than 90/10.

A battery pack, an electronic device, an electric vehicle, a power storage device, and a power system each according to an embodiment of the present technology include the above-described battery.

Advantageous Effects of Invention

According to the present technology, safety can be ensured without sacrificing the capacity.

BRIEF DESCRIPTION OF DRAWINGS

FIG. 4 is a disassembled perspective view showing a configuration example of a simplified battery pack.

Figure 1:
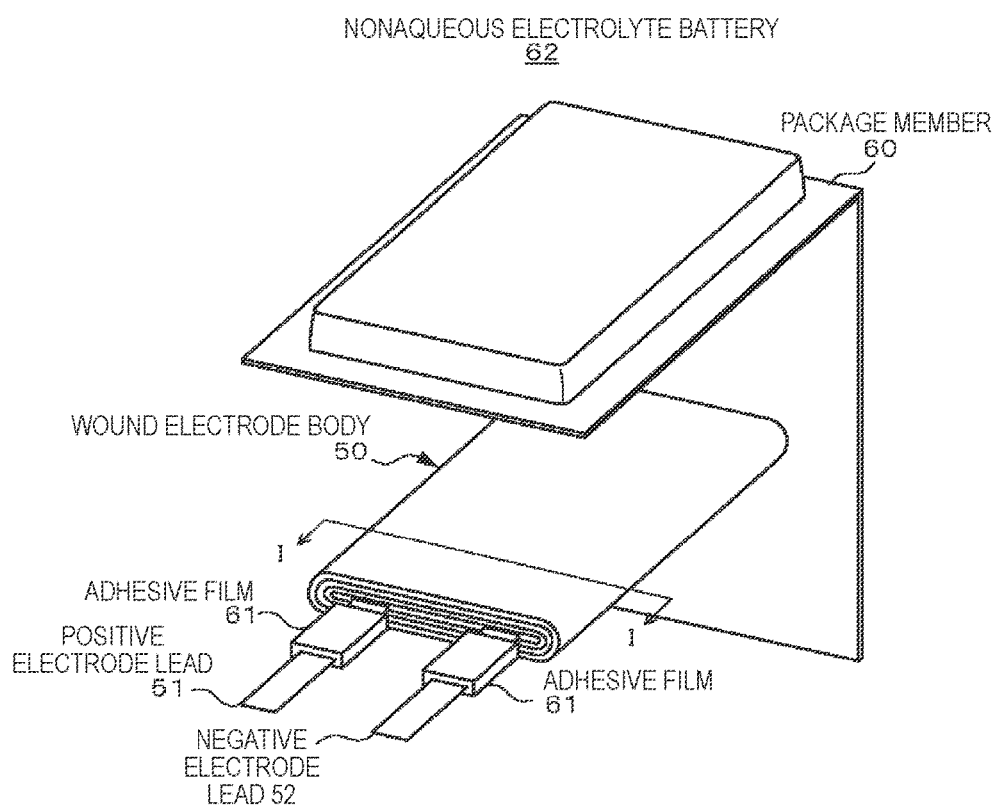
FIG. 1 is a disassembled perspective view showing the configuration of a nonaqueous electrolyte battery of a laminated film type according to a first embodiment of the present technology.

DESCRIPTION OF EMBODIMENTS (Technical Background of the Present Technology)

First, the technical background of the present technology is described for easier understanding of the present technology. As described in the section of "Background Art," in Patent Literature 1 (JP 2010-198757A), it is proposed to mix particles of alumina or the like in the gel electrolyte to improve the strength of the gel electrolyte.

When manufacturing the battery described in Patent Literature 1, the following method or the like is employed. That is, a gel electrolyte provided with fluidity beforehand (a gel electrolyte prepared in a sol form using a solvent or prepared in a hot molten form by melting by heat) is formed on an electrode (or a separator), and is then solidified. After that, the electrode and the separator are stacked and/or wound to form an electricity generating element (a wound electrode body or a stacked electrode body).

When forming the electricity generating element, the gel electrolyte is applied at least to the entire surface of an active material mixture layer (an active material layer); here, it is important to provide the gel electrolyte sufficiently also to, in particular, the cut end surface including the active material mixture layer of the electrode. This is because an insufficient level of the electrolyte not only causes a loss in capacity due to the occurrence of a portion that cannot contribute to the reaction of charging, but also causes the dissolving-out etc. of metal ions due to a burr that has occurred on the cut end surface, an electrically conductive agent that has come off, or a phenomenon in which a high electric potential is applied, and this may result in a short-circuit accident.

However, when the gel electrolyte in which particles of alumina or the like are mixed is attempted to be sufficiently applied to the cut end surface of the electrode, a state in which a gel electrolyte layer with a width larger than the width of the electrode is formed and the gel electrolyte layer protrudes in the width direction from both ends in the width direction of the electrode will be caused. If this state occurs after the application, since the gel electrolyte in which particles of alumina or the like are mixed is cloudy or the like, it is difficult to distinguish the outline of the electrode viewed through the gel electrolyte.

Hence, when forming the electricity generating element, it is difficult to superimpose the positive electrode end, the separator end, and the negative electrode end accurately with an appropriate clearance (the spacing in the width direction between ends). When stacking or winding the electrodes and the separator, it is important to superimpose the positive electrode end, the separator end, and the negative electrode end accurately with an appropriate clearance. This is because a short-circuit accident is prevented by suppressing direct contact and local precipitation of lithium on the negative electrode by, for example, setting the external dimensions of the electrodes in such a manner that the negative electrode is wider than the positive electrode and the separator is still wider, and an appropriate clearance is provided between each two of the three end portions. A positional deviation from the appropriate clearance may cause a serious short-circuit accident, and should thus be avoided.

In this regard, when using the gel electrolyte in which particles of alumina or the like are mixed, for example, a method of reducing the size of the positive electrode (reducing the width of the positive electrode) has been employed because setting a larger clearance reduces the possibility of a short circuit. However, in this method, the battery capacity is reduced, and consequently the capacity is spoiled. That is, while safety can be ensured, the capacity is sacrificed.

With regard to such an issue, the present technology improves the transparency of the gel electrolyte, and thereby provides a battery, an electrolyte, a battery pack, an electronic device, an electric vehicle, a power storage device, and a power system in which safety can be ensured without sacrificing the capacity.

Hereinbelow, embodiments of the present technology are described with reference to the drawings. The description is given in the following order.
1. First embodiment (a first example and a second example of the battery)
2. Second embodiment (an example of the battery pack)
3. Third embodiment (an example of the battery pack)
4. Fourth embodiment (examples of the power storage system etc.)
5. Other embodiments (modification examples)

The embodiments etc. described below are preferred specific examples of the present technology, and the subject matter of the present technology is not limited to these embodiments etc. Further, the effects described in the present specification are only examples and are not limitative ones, and the existence of effects different from the illustrated effects is not denied.

1. First Embodiment

In a first embodiment of the present technology, a nonaqueous electrolyte battery of a laminated film type (a battery) is described. The nonaqueous electrolyte battery is, for example, a nonaqueous electrolyte secondary battery in which charging and discharging are possible, such as a lithium-ion secondary battery. In the following, two configuration examples (a first example and a second example) of the nonaqueous electrolyte battery of a laminated film type are described.

(1-1) First Example

Configuration Example of the Nonaqueous Electrolyte Battery

FIG. 1 shows the configuration of a nonaqueous electrolyte battery 62 according to the first embodiment. The nonaqueous electrolyte battery 62 is of what is called a laminated film type; and in the battery, a wound electrode body 50 equipped with a positive electrode lead 51 and a negative electrode lead 52 is housed in a film-shaped package member 60.

Each of the positive electrode lead 51 and the negative electrode lead 52 is led out from the inside of the package member 60 toward the outside in the same direction, for example. The positive electrode lead 51 and the negative electrode lead 52 are each formed using, for example, a metal material such as aluminum, copper, nickel, or stainless steel or the like, in a thin plate state or a network state.

The package member 60 is, for example, formed of a laminated film obtained by forming a resin layer on both surfaces of a metal layer. In the laminated film, an outer resin layer is formed on a surface of the metal layer, the surface being exposed to the outside of the battery, and an inner resin layer is formed on an inner surface of the battery, the inner surface being opposed to a power generation element such as the wound electrode body 50.

The metal layer plays a most important role to protect contents by preventing the entrance of moisture, oxygen, and light. Because of the lightness, stretching property, price, and easy processability, aluminum (Al) is most commonly used for the metal layer. The outer resin layer has beautiful appearance, toughness, flexibility, and the like, and is formed using a resin material such as nylon or polyethylene terephthalate (PET). Since the inner rein layers are to be melt by heat or ultrasonic waves to be welded to each other, a polyolefin resin is appropriately used for the inner resin layer, and cast polypropylene (CPP) is often used. An adhesive layer may be provided as necessary between the metal layer and each of the outer resin layer and the inner resin layer.

A depression portion in which the wound electrode body 50 is housed is formed in the package member 60 by deep drawing for example, in a direction from the inner resin layer side to the outer resin layer. The package member 60 is provided such that the inner resin layer is opposed to the wound electrode body 50. The inner resin layers of the package member 60 opposed to each other are adhered by welding or the like in an outer periphery portion of the depression portion. An adhesive film 61 is provided between the package member 60 and each of the positive electrode lead 51 and the negative electrode lead 52 for the purpose of increasing the adhesion between the inner resin layer of the package member 60 and each of the positive electrode lead 51 and the negative electrode lead 52 which are formed using metal materials. This adhesive film 61 is formed using a resin material having high adhesion to the metal material, examples of which being polyolefin resins such as polyethylene, polypropylene, modified polyethylene, and modified polypropylene.

Note that the metal layer of the package member 60 may also be formed using a laminated film having another lamination structure, or a polymer film such as polypropylene or a metal film, instead of the aluminum laminated film formed using aluminum (Al).

Figure 2A:
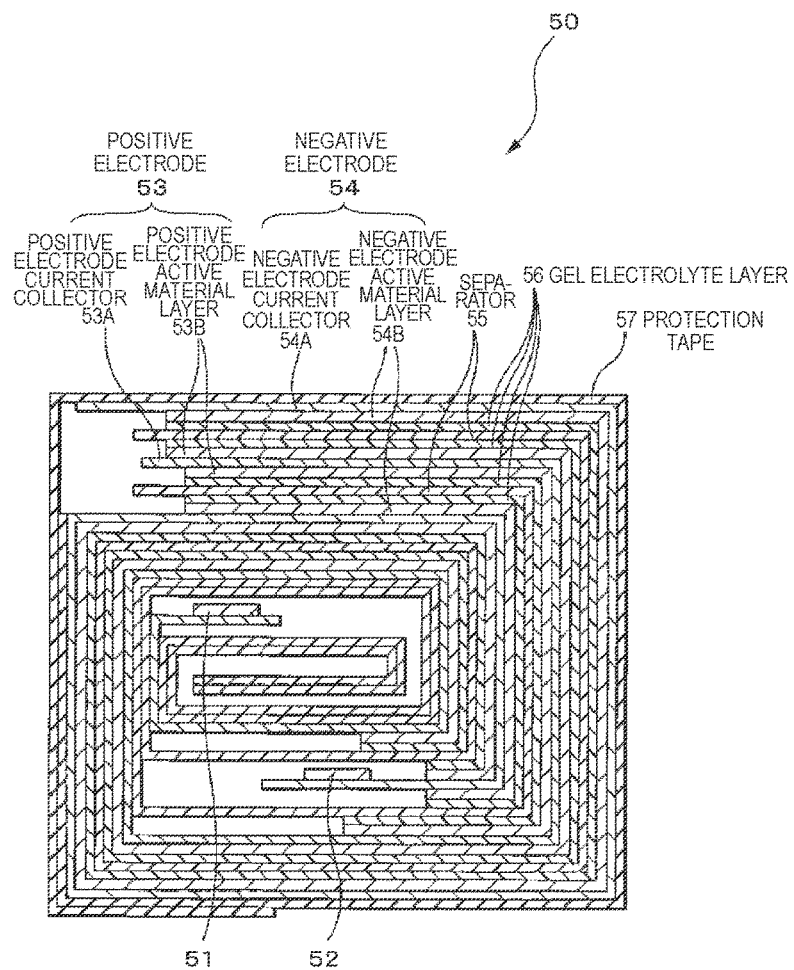
FIG. 2A is a cross-sectional view showing a cross-sectional configuration along line I-I of the wound electrode body shown in FIG. 1.
Figure 2B:
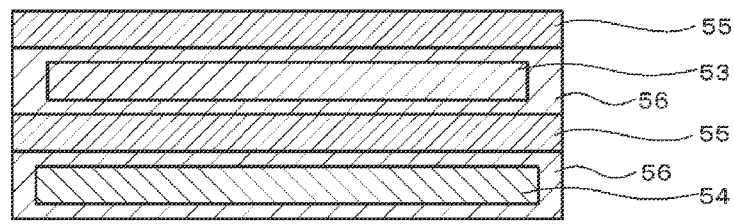
FIG. 2B is a schematic cross-sectional view showing part of a cross section along the direction orthogonal to line I-I of the wound electrode body.

FIG. 2A shows a cross-sectional structure along line I-I of the wound electrode body 50 shown in FIG. 1. FIG. 2B is a schematic cross-sectional view showing part of a cross section along the direction orthogonal to line I-I of the wound electrode body 50. As shown in FIG. 2A, the wound electrode body 50 is a body in which a band-like positive electrode 53 and a band-like negative electrode 54 are stacked and wound via a band-like separator 55 and a gel electrolyte layer 56, and the outermost peripheral portion is protected by a protection tape 57 as necessary.

As shown in FIG. 2B, the magnitude relationships between the width of the band-like positive electrode 53, the width of the band-like negative electrode 54, and the width of the band-like separator 55 are typically set to, for example, the width of the band-like positive electrode 53<the width of the band-like negative electrode 54<the width of the band-like separator 55. The gel electrolyte layer 56 is formed with a width larger than the width of the band-like positive electrode 53 and the width of the band-like negative electrode 54, and covers at least part of both end surfaces in the width direction of the band-like positive electrode 53 and at least part of both end surfaces in the width direction of the band-like negative electrode 54. The gel electrolyte layer 56 preferably covers the whole of both end surfaces of the positive electrode 53 and both end surfaces of the negative electrode 54. The positive electrode 53, the negative electrode 54, and the separator 55 are stacked via the gel electrolyte layer 56 formed between adjacent ones of them in such a manner that the spacing between each two of the end of the positive electrode 53, the end of the negative electrode 54, and the end of the separator 55 has a prescribed appropriate clearance in the width direction.

[Positive Electrode]

The positive electrode 53 has a structure in which a positive electrode active material layer 53B is provided on one surface or both surfaces of a positive electrode current collector 53A.

The positive electrode 53 is an electrode in which the positive electrode active material layer 53B containing a positive electrode active material is formed on both surfaces of the positive electrode current collector 53A. As the positive electrode current collector 53A, for example, a metal foil such as aluminum (Al) foil, nickel (Ni) foil, or stainless steel (SUS) foil may be used.

The positive electrode active material layer 53B is configured to contain, for example, a positive electrode active material, an electrically conductive agent, and a binder. As the positive electrode active material, one or more positive electrode materials that can occlude and release lithium may be used, and another material such as a binder or an electrically conductive agent may be contained as necessary.

As the positive electrode material that can occlude and release lithium, for example, a lithium-containing compound is preferable. This is because a high energy density is obtained. As the lithium-containing compound, for example, a composite oxide containing lithium and a transition metal element, a phosphate compound containing lithium and a transition metal element, or the like is given. Of them, a material containing at least one of the group consisting of cobalt (Co), nickel (Ni), manganese (Mn), and iron (Fe) as a transition metal element is preferable. This is because a higher voltage is obtained.

As the positive electrode material, for example, a lithium-containing compound expressed by $Li_xM1O_2$ or $Li_yM2PO_4$ may be used. In the formulae, M1 and M2 represent one or more transition metal elements. The values of x and y vary with the charging and discharging state of the battery, and are usually $0.05 \leq x \leq 1.10$ and $0.05 \leq y \leq 1.10$. As the composite oxide containing lithium and a transition metal element, for example, a lithium cobalt composite oxide ($Li_xCoO_2$), a lithium nickel composite oxide ($Li_xNiO_2$), a lithium nickel cobalt composite oxide ($Li_xNi_{1-z}Co_zO_2$ ($0<z<1$)), a lithium nickel cobalt manganese composite oxide ($Li_xNi_{(1-v-w)}Co_vMn_wO_2$ ($0<v+w<1$, $v>0$, $w>0$)), a lithium manganese composite oxide ($LiMn_2O_4$) or a lithium manganese nickel composite oxide ($LiMn_{2-t}Ni_tO_4$ ($0<t<2$)) having the spinel structure, or the like is given. Of them, a composite oxide containing cobalt is preferable. This is because a high capacity is obtained and also excellent cycle characteristics are obtained. As the phosphate compound containing lithium and a transition metal element, for example, a lithium iron phosphate compound ($LiFePO_4$), a lithium iron manganese phosphate compound ($LiFe_{1-u}Mn_uPO_4$ ($0<u<1$)), or the like is given.

As such a lithium composite oxide, specifically, lithium cobaltate ($LiCoO_2$), lithium nickelate ($LiNiO_2$), lithium manganate ($LiMn_2O_4$), or the like is given. Also a solid solution in which part of the transition metal element is substituted with another element may be used. For example, a nickel cobalt composite lithium oxide ($LiNi_{0.5}Co_{0.5}O_2$, $LiNi_{0.8}Co_{0.2}O_2$, etc.) is given as an example thereof. These lithium composite oxides can generate a high voltage, and have an excellent energy density.

From the viewpoint of higher electrode fillability and cycle characteristics being obtained, also a composite particle in which the surface of a particle made of any one of the lithium-containing compounds mentioned above is coated with minute particles made of another of the lithium-containing compounds may be used.

Other than these, as the positive electrode material that can occlude and release lithium, for example, an oxide such as vanadium oxide ($V_2O_5$), titanium dioxide ($TiO_2$), or manganese dioxide ($MnO_2$), a disulfide such as iron disulfide ($FeS_2$), titanium disulfide ($TiS_2$), or molybdenum disulfide ($MoS_2$), a chalcogenide not containing lithium such as niobium diselenide ($NbSe_2$) (in particular, a layered compound or a spinel-type compound), and a lithium-containing compound containing lithium, and also an electrically conductive polymer such as sulfur, polyaniline, polythiophene, polyacetylene, or polypyrrole are given. The positive electrode material that can occlude and release lithium may be a material other than the above as a matter of course. The positive electrode materials mentioned above may be mixed in an arbitrary combination of two or more.

As the electrically conductive agent, for example, a carbon material such as carbon black or graphite, or the like is used. As the binder, for example, at least one selected from a resin material such as polyvinylidene difluoride (PVdF), polytetrafluoroethylene (PTFE), polyacrylonitrile (PAN), styrene-butadiene rubber (SBR), and carboxymethylcellulose (CMC), a copolymer having such a resin material as a main component, and the like is used.

The positive electrode 53 includes a positive electrode lead 51 connected to an end portion of the positive electrode current collector 53A by spot welding or ultrasonic welding. The positive electrode lead 51 is preferably formed of net-like metal foil, but there is no problem when a non-metal material is used as long as an electrochemically and chemically stable material is used and an electric connection is obtained. Examples of materials of the positive electrode lead 51 include aluminum (Al), nickel (Ni), and the like.

[Negative Electrode]

The negative electrode 54 has a structure in which a negative electrode active material layer 54B is provided on one of or both surfaces of a negative electrode current collector 54A, and is disposed such that the negative electrode active material layer 54B is opposed to the positive electrode active material layer 53B.

Although not shown, the negative electrode active material layer 54B may be provided only on one surface of the negative electrode current collector 54A. The negative electrode current collector 54A is formed of, for example, a metal foil such as copper foil.

The negative electrode active material layer 54B is configured to contain, as the negative electrode active material, one or more negative electrode materials that can occlude and release lithium, and may be configured to contain another material such as a binder or an electrically conductive agent similar to that of the positive electrode active material layer 53B, as necessary.

In the nonaqueous electrolyte battery 62, the electrochemical equivalent of the negative electrode material that can occlude and release lithium is set larger than the electrochemical equivalent of the positive electrode 53, and theoretically lithium metal is prevented from being precipitated on the negative electrode 54 in the course of charging.

In the nonaqueous electrolyte battery 62, the open circuit voltage (that is, the battery voltage) in the full charging state is designed to be in the range of, for example, not less than 2.80 V and not more than 6.00 V. In particular, when a material that becomes a lithium alloy at near 0 V with respect to $Li/Li^+$ or a material that occludes lithium at near 0 V with respect to $Li/Li^+$ is used as the negative electrode active material, the open circuit voltage in the full charging state is designed to be in the range of, for example, not less than 4.20 V and not more than 6.00 V. In this case, the open circuit voltage in the full charging state is preferably set to not less than 4.25 V and not more than 6.00 V. When the open circuit voltage in the full charging state is set to 4.25 V or more, the amount of lithium released per unit mass is larger than in a battery of 4.20 V, provided that the positive electrode active material is the same; and thus the amounts of the positive electrode active material and the negative electrode active material are adjusted accordingly. Thereby, a high energy density is obtained.

As the negative electrode material that can occlude and release lithium, for example, a carbon material such as non-graphitizable carbon, graphitizable carbon, graphite, pyrolytic carbons, cokes, glassy carbons, organic polymer compound fired materials, carbon fibers, or activated carbon is given. Of them, the cokes include pitch coke, needle coke, petroleum coke, or the like. The organic polymer compound fired material refers to a material obtained by carbonizing a polymer material such as a phenol resin or a furan resin by firing at an appropriate temperature, and some of them are categorized into non-graphitizable carbon or graphitizable carbon. These carbon materials are preferable because there is very little change in the crystal structure occurring during charging and discharging, high charging and discharging capacities can be obtained, and good cycle characteristics can be obtained. In particular, graphite is preferable because the electrochemical equivalent is large and a high energy density can be obtained. Further, non-graphitizable carbon is preferable because excellent cycling characteristics can be obtained. Furthermore, it is preferable to use a carbon material having a low charge/discharge potential, i.e., a charge/discharge potential that is close to that of a lithium metal, because the battery can obtain a higher energy density easily.

As another negative electrode material that can occlude and release lithium and can be increased in capacity, a material that can occlude and release lithium and contains at least one of a metal element and a semi-metal element as a constituent element is given. This is because a high energy density can be obtained by using such a material. In particular, using the material together with a carbon material is more preferable because a high energy density can be obtained and also excellent cycle characteristics can be obtained. The negative electrode material may be a simple substance, an alloy, or a compound of a metal element or a semi-metal element, or may be a material that includes a phase of one or more of them at least partly. Note that in the present technology, the alloy includes a material formed with two or more kinds of metal elements and a material containing one or more kinds of metal elements and one or more kinds of semi-metal elements. Further, the alloy may contain a non-metal element. Examples of its texture include a solid solution, a eutectic (eutectic mixture), an intermetallic compound, and one in which two or more kinds thereof coexist.

Examples of the metal element or semi-metal element contained in this negative electrode material include a metal element or a semi-metal element capable of forming an alloy together with lithium. Specifically, such examples include magnesium (Mg), boron (B), aluminum (Al), titanium (Ti), gallium (Ga), indium (In), silicon (Si), germanium (Ge), tin (Sn), lead (Pb), bismuth (Bi), cadmium (Cd), silver (Ag), zinc (Zn), hafnium (Hf), zirconium (Zr), yttrium (Y), palladium (Pd), and platinum (Pt). These materials may be crystalline or amorphous.

As the negative electrode material, it is preferable to use a material containing, as a constituent element, a metal element or a semi-metal element of 4B group in the short periodical table. It is more preferable to use a material containing at least one of silicon (Si) and tin (Sn) as a constituent element. It is even more preferable to use a material containing at least silicon. This is because silicon (Si) and tin (Sn) each have a high capability of occluding and releasing lithium, so that a high energy density can be obtained. Examples of the negative electrode material containing at least one of silicon and tin include a simple substance, an alloy, or a compound of silicon, a simple substance, an alloy, or a compound of tin, and a material containing, at least partly, a phase of one or more kinds thereof.

Examples of the alloy of silicon include alloys containing, as a second constituent element other than silicon, at least one selected from the group consisting of tin (Sn), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr). Examples of the alloy of tin include alloys containing, as a second constituent element other than tin (Sn), at least one selected from the group consisting of silicon (Si), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr).

Examples of the compound of tin (Sn) or the compound of silicon (Si) include compounds containing oxygen (O) or carbon (C), which may contain any of the above-described second constituent elements in addition to tin (Sn) or silicon (Si).

Among them, as the negative electrode material, an SnCoC-containing material is preferable which contains cobalt (Co), tin (Sn), and carbon (C) as constituent elements, the content of carbon is higher than or equal to 9.9 mass % and lower than or equal to 29.7 mass %, and the ratio of cobalt in the total of tin (Sn) and cobalt (Co) is higher than or equal to 30 mass % and lower than or equal to 70 mass %. This is because the high energy density and excellent cycling characteristics can be obtained in these composition ranges.

The SnCoC-containing material may also contain another constituent element as necessary. For example, it is preferable to contain, as the other constituent element, silicon (Si), iron (Fe), nickel (Ni), chromium (Cr), indium (In), niobium (Nb), germanium (Ge), titanium (Ti), molybdenum (Mo), aluminum (Al), phosphorous (P), gallium (Ga), or bismuth (Bi), and two or more kinds of these elements may be contained. This is because the capacity characteristics or cycling characteristics can be further increased.

Note that the SnCoC-containing material has a phase containing tin (Sn), cobalt (Co), and carbon (C), and this phase preferably has a low crystalline structure or an amorphous structure. Further, in the SnCoC-containing material, at least a part of carbon (C), which is a constituent element, is preferably bound to a metal element or a semi-metal element that is another constituent element. This is because, when carbon (C) is bound to another element, aggregation or crystallization of tin (Sn) or the like, which is considered to cause a decrease in cycling characteristics, can be suppressed.

Examples of a measurement method for examining the binding state of elements include X-ray photoelectron spectroscopy (XPS). In the XPS, so far as graphite is concerned, a peak of the is orbit (Cis) of carbon appears at 284.5 eV in an energy-calibrated apparatus such that a peak of the 4f orbit (Au4f) of a gold (Au) atom is obtained at 84.0 eV. Also, so far as surface contamination carbon is concerned, a peak of the 1s orbit (C1s) of carbon appears at 284.8 eV. On the contrary, when a charge density of the carbon element is high, for example, when carbon is bound to a metal element or a semi-metal element, the peak of C1s appears in a region lower than 284.5 eV. That is, when a peak of a combined wave of C1s obtained regarding the SnCoC-containing material appears in a region lower than 284.5 eV, at least a part of carbon contained in the SnCoC-containing material is bound to a metal element or a semi-metal element, which is another constituent element.

In the XPS measurement, for example, the peak of C1s is used for correcting the energy axis of a spectrum. In general, since surface contamination carbon exists on the surface, the peak of C1s of the surface contamination carbon is fixed at 284.8 eV, and this peak is used as an energy reference. In the XPS measurement, since a waveform of the peak of C1s is obtained as a form including the peak of the surface contamination carbon and the peak of carbon in the SnCoC-containing material, the peak of the surface contamination carbon and the peak of the carbon in the SnCoC-containing material are separated from each other by means of analysis using, for example, a commercially available software program. In the analysis of the waveform, the position of a main peak existing on the lowest binding energy side is used as an energy reference (284.8 eV).

As the negative electrode material that can occlude and release lithium, for example, also a metal oxide, a polymer compound, or other materials that can occlude and release lithium are given. As the metal oxide, for example, a lithium titanium oxide containing titanium and lithium such as lithium titanate ($Li_4Ti_5O_{12}$), iron oxide, ruthenium oxide, molybdenum oxide, or the like is given. As the polymer compound, for example, polyacetylene, polyaniline, polypyrrole, or the like is given.

[Separator]

The separator 55 is a porous membrane formed of an insulating membrane that has a large ion permeability and a prescribed mechanical strength. A nonaqueous electrolyte solution is retained in the pores of the separator 55.

As the resin material that forms the separator 55 like this, for example, a polyolefin resin such as polypropylene or polyethylene, an acrylic resin, a styrene resin, a polyester resin, a nylon resin, or the like is preferably used. In particular, a polyolefin resin such as a polyethylene such as low-density polyethylene, high-density polyethylene, or linear polyethylene, a low molecular weight wax component thereof, or polypropylene is preferably used because it has a suitable melting temperature and is easily available. Also a structure in which two or more kinds of these porous membranes are stacked or a porous membrane formed by melt-kneading two or more resin materials is possible. A material containing a porous membrane made of a polyolefin resin has good separability between the positive electrode 53 and the negative electrode 54, and can further reduce the possibility of an internal short circuit.

The thickness of the separator 55 may be set arbitrarily to the extent that it is not less than the thickness that can keep necessary strength. The separator 55 is preferably set to such a thickness that the separator 55 provides insulation between the positive electrode 53 and the negative electrode 54 to prevent a short circuit etc., has ion permeability for producing battery reaction via the separator 55 favorably, and can make the volumetric efficiency of the active material layer that contributes to battery reaction in the battery as high as possible. Specifically, the thickness of the separator 55 is preferably not less than 4 μm and not more than 20 μm, for example.

[Gel Electrolyte Layer]

The gel electrolyte layer 56 contains a filler, a matrix polymer compound that is a resin, and a nonaqueous electrolyte solution (an electrolyte solution) containing a solvent and an electrolyte salt. The gel electrolyte layer 56 is a layer made of a gel-like electrolyte in which the nonaqueous electrolyte solution is retained by the matrix polymer compound. The gel electrolyte layer 56 is in what is called a gel form in which, for example, the matrix polymer compound is impregnated with the electrolyte solution and the matrix polymer compound is swollen. In the gel electrolyte layer 56, for example, the gel-like matrix polymer itself that has absorbed and retains the electrolyte solution functions as an ion conductor. Since a filler is contained in the gel electrolyte layer 56, the strength etc. of the gel electrolyte layer 56 are improved, and characteristics such as safety can be improved.

In the present technology, in order to improve the transparency of the gel electrolyte layer 56, particles having a refractive index in a prescribed range and a particle size in a prescribed range are contained as a filler contained in the gel electrolyte layer 56, and at least one of the mass ratio between the particles and the resin of the gel electrolyte layer 56 (particles/resin) and the mass ratio between the particles and the electrolyte salt (particles/electrolyte salt) is set in a prescribed range. By the gel electrolyte layer 56 being transparent, a situation in which, due to the gel electrolyte layer 56 not being transparent, it is impossible for the battery to ensure safety without sacrificing the capacity can be avoided.

The reason why the gel electrolyte layer 56 is configured in the above manner in order to improve the transparency of the gel electrolyte layer 56 will now be described. A white inorganic powder such as alumina particles, for example, is formed of colorless, transparent particles, but appears white due to a light scattering phenomenon. The inventors of the present application made extensive research and have found that the scattering in the gel electrolyte occurs on a particle surface having a size almost in the same range as the wavelengths of visible light (visible light of blue, green, yellow, orange, and red) (more than 450 nm and less than 750 nm). It has been found that the scattering can be avoided by selecting a particle with a smaller particle size than the wavelength range mentioned above, or selecting a particle with a larger particle size than the wavelength range mentioned above. Specifically, a particle in the range of not less than 50 nm and not more than 450 nm, or a particle of not less than 750 nm and not more than 10,000 nm is effective. However, if the particle size is too small, the viscosity will be higher than the coating material viscosity appropriate for application; thus, the particle size is preferably 50 nm or more. If the particle size is larger than 10,000 nm, the particle may be larger than the target thickness of application, and the thickness of the battery will not conform with the design.

The particle size of the particle contained in the gel electrolyte layer 56 can be prescribed by the value of the particle size D50. When the particle size D50 is within the range mentioned above (a particle of not less than 50 nm and not more than 450 nm, or not less than 750 nm and not more than 10,000 nm), the transparency as a whole can be kept even when some particle sizes in the particle size distribution, such as D10 and D90, are within the wavelength region of visible light mentioned above (more than 450 nm and less than 750 nm). Also even when particles are aggregated to form secondary particles, since the size of the surface concavity or convexity of the secondary particle is equivalent to the wavelength that causes light scattering, the particle size of one particle that creates the concavity or convexity is important.

It is also found that the transparency is increased by suppressing the scattering due to the refraction of light derived from the difference between the refractive index of the gel electrolyte and the refractive index of the particle (solids have higher refractive indices and liquids have lower refractive indices). A solid electrolyte (gel electrolyte) contains a large amount of electrolyte solution components, and therefore has a refractive index of not less than 1.3 and not more than 1.8 in many cases; and when a material with a refractive index as close as possible to this range (refractive index being less than 2.4, preferably 2.1 or less) is selected, light can travel straight when it is transmitted through the particle of the electrolyte (gel electrolyte).

At least one of the mass ratio between the particles and the resin of the gel electrolyte layer 56 (particles/resin) and the mass ratio between the particles and the electrolyte salt (particles/electrolyte salt) is set in a prescribed range (not less than 15/85 and not more than 90/10). Since the refractive index of the gel electrolyte and the refractive index of the particle are not the same, the transparency of the gel electrolyte layer 56 can be ensured by setting the range of the mass ratio mentioned above to reduce the ratio of the particles and thereby preventing the increase in cloudiness, if any. Although it is preferable for the ratio of the particles to be lower from the viewpoint of ensuring the transparency of the gel electrolyte layer 56, an excessively small ratio of the particles causes the strength of the gel electrolyte layer 56 to tend to be reduced; thus, the lower limit value of the mass ratio mentioned above is set.

In order to bring the refractive index of the gel electrolyte close to that of the particle, it is preferable that the content ratio of the matrix polymer compound to the gel electrolyte be set in a prescribed range. Since the refractive index of the matrix polymer compound is higher than that of the solvent of the electrolyte solution, a larger content ratio of the matrix polymer compound provides a refractive index closer to the refractive index of the solid particle. On the other hand, if the content ratio of the matrix polymer compound is too large, the ion transfer resistance of the battery is increased and the output tends to be poor.

Furthermore, in order to bring the refractive index of the gel electrolyte close to that of the particle, it is preferable that the content ratio of the electrolyte salt to the gel electrolyte be set in a prescribed range. As the content ratio of the electrolyte salt increases, the refractive index of the gel electrolyte becomes closer to the refractive index of the particle. On the other hand, if the content ratio of the electrolyte salt is too large, the ion transfer resistance of the battery is increased and the output becomes poor.

"Being transparent" refers to transparency at such a level that the outline of the electrode (the separator 55 when the electrode is formed on the separator 55) can be visually identified through the gel electrolyte layer 56 formed on the electrode (or the separator 55). Not to mention the case where the outline of the electrode (or the separator 55) can be visually identified clearly through the gel electrolyte layer 56, also the case where the outline of the electrode (or the separator 55) can be visually identified faintly is included in "being transparent." The state where the gel electrolyte layer 56 is semitransparent, in a colored state, in a cloudy state, or the like and the outline of the electrode (or the separator 55) cannot be visually identified at all through the gel electrolyte layer 56 is not included in "being transparent." The case where the outline of the electrode (or the separator 55) is visually identified more clearly through the gel electrolyte layer 56 (transparency being higher) is preferable because it is easier to ensure safety.

(Thickness of the Gel Electrolyte Layer)

The thickness of the gel electrolyte layer 56 is, typically, preferably not less than 1 μm and not more than 15 μm, more preferably not less than 2 μm and not more than 8 μm, for example. Since scattering cannot be eliminated completely, when the thickness of the gel electrolyte layer 56 is larger, the feeling of transparency is smaller; thus, in order to cause the end of the electrode to stand out, it is necessary to ensure the contrast by reducing the cloudiness on the electrode. Hence, the gel electrolyte layer 56 is preferably applied and formed thin; but if the thickness of the gel electrolyte layer 56 is smaller than 1 μm, the battery performance tends to be reduced. On the other hand, if the gel electrolyte layer 56 is more than 15 μm, the distance between the electrodes is widened, and the energy density per volume tends to be reduced.

The filler, the nonaqueous electrolyte solution, and the resin contained in the gel electrolyte layer 56 will now be described.

[Nonaqueous Electrolyte Solution]

The nonaqueous electrolyte solution contains an electrolyte salt and a nonaqueous solvent in which the electrolyte salt is dissolved.

[Electrolyte Salt]

The electrolyte salt contains, for example, one or two or more kinds of a light metal compound such as a lithium salt. Examples of this lithium salt include lithium hexafluorophosphate ($LiPF_6$), lithium tetrafluoroborate ($LiBF_4$), lithium perchlorate ($LiClO_4$), lithium hexafluoroarsenate ($LiAsF_6$), lithium tetraphenylborate ($LiB(C_6H_5)_4$), lithium methanesulfonate ($LiCH_3SO_3$), lithium trifluoromethanesulfonate ($LiCF_3SO_3$), lithium tetrachloroaluminate ($LiAlCl_4$), dilithium hexafluorosilicate ($Li_2SiF_6$), lithium chloride (LiCl), lithium bromide (LiBr), and the like. Among them, at least one selected from the group consisting of lithium hexafluorophosphate, lithium tetrafluoroborate, lithium perchlorate, and lithium hexafluoroarsenate is preferable, and lithium hexafluorophosphate is more preferable.

[Nonaqueous Solvent]

Examples of the nonaqueous solvent include lactone-based solvents (e.g., γ-butyrolactone, γ-valerolactone, δ-valerolactone, and ε-caprolactone), carbonate-based solvents (e.g., ethylene carbonate, propylene carbonate, butylene carbonate, vinylene carbonate, dimethyl carbonate, ethyl methyl carbonate, and diethyl carbonate), ether-based solvents (e.g., 1,2-dimethoxyethane, 1-ethoxy-2-methoxyethane, 1,2-diethoxyethane, tetrahydrofuran, and 2-methyl-tetrahydrofuran), nitrile-based solvents (e.g., acetonitrile), and solvents such as sulfolane-based solvents, phosphoric acids, phosphate solvents, and pyrrolidones. As the nonaqueous solvent, it is possible to use any of the above examples alone or two or more examples mixed.

Further, as the nonaqueous solvent, it is preferable to use a mixture of cyclic carbonate and chain carbonate, and it is more preferable to contain a compound in which a part of or all of hydrogen in the cyclic carbonate or chain carbonate is fluorinated. As this fluorinated compound, it is preferable to use fluoroethylene carbonate (4-fluoro-1,3-dioxolan-2-one, FEC) or difluoroethylene carbonate (4,5-difluoro-1,3-dioxolan-2-one, DFEC). This is because, even in a case of using the negative electrode 54 containing a compound such as silicon (Si), tin (Sn), or germanium (Ge) as the negative electrode active material, it is possible to increase charge/discharge cycling characteristics. In particular, difluoroethylene carbonate is preferably used as the nonaqueous solvent because cycling characteristics improving effects are excellent.

[Resin]

For the resin, a resin having the property of compatibility with the solvent, or the like may be used as the matrix polymer compound that retains the electrolyte solution. As such a resin, a fluorine-containing resin such as polyvinylidene difluoride or polytetrafluoroethylene, a fluorine-containing rubber such as a vinylidene fluoride-tetrafluoroethylene copolymer or an ethylene-tetrafluoroethylene copolymer, a rubber such as a styrene-butadiene copolymer and a hydride thereof, an acrylonitrile-butadiene copolymer and a hydride thereof, an acrylonitrile-butadiene-styrene copolymer and a hydride thereof, a methacrylic acid ester-acrylic acid ester copolymer, a styrene-acrylic acid ester copolymer, an acrylonitrile-acrylic acid ester copolymer, ethylene-propylene rubber, polyvinyl alcohol, or polyvinyl acetate, a cellulose derivative such as ethyl cellulose, methyl cellulose, hydroxyethyl cellulose, or carboxymethyl cellulose, a resin of which at least one of the melting point and the glass transition temperature is 180° C. or more such as polyphenylene ether, a polysulfone, a polyethersulfone, polyphenylene sulfide, a polyetherimide, a polyimide, a polyamide (in particular, an aramid), a polyamide-imide, polyacrylonitrile, polyvinyl alcohol, a polyether, an acrylic acid resin, or a polyester, polyethylene glycol, or the like is given.

[Filler]

As the filler contained in the gel electrolyte layer 56, particles having a particle size in a prescribed range and a refractive index in a prescribed range are used from the viewpoint of reducing light scattering to allow the transparency of the gel electrolyte layer 56 to be improved.

As the particle size of the particle, the particle size D50 is set to not less than 50 nm and not more than 450 nm, or not less than 750 nm and not more than 10,000 nm. This is because the transparency of the entire electrolyte can be ensured by using a particle having a particle size in these ranges. This is also because, if the particle size is less than 50 nm, the particle size is too small and the viscosity will be higher than the coating material viscosity appropriate for application. This is also because, if the particle size is larger than 10,000 nm, the particle may be larger than the target thickness of application, and the thickness of the battery will not conform with the design.

As the upper limit of the range of the particle size D50 of not less than 750 nm and not more than 10,000 nm mentioned above, from the viewpoint of the battery capacity, 8000 nm or less is set, 7000 nm or less is preferable, and 5000 nm or less is more preferable. As the lower limit of the range of not less than 750 nm and not more than 10,000 nm mentioned above, 800 nm or more is preferable and 2000 nm or more is more preferable from the viewpoint of improving the transparency of the gel electrolyte more. As the upper limit of the range of the particle size D50 of not less than 50 nm and not more than 450 nm mentioned above, 400 nm or less is preferable and 300 nm or less is more preferable from the viewpoint of improving the transparency of the gel electrolyte layer 56 more.

As the particle size of the particle, in addition to the particle size D50, the particle size D40 and the particle size D60 are preferably not less than 50 nm and not more than 450 nm, or not less than 750 nm and not more than 10,000 nm, from the viewpoint of improving the transparency of the gel electrolyte layer 56 more. That is, it is preferable that the particle size D50 of the particle be not less than 50 nm and not more than 450 nm, the particle size D40 be not less than 50 nm and not more than 450 nm, and the particle size D60 be not less than 50 nm and not more than 450 nm. Alternatively, it is preferable that the particle size D50 of the particle be not less than 750 nm and not more than 10,000 nm, the particle size D40 be not less than 750 nm and not more than 10,000 nm, and the particle size D60 be not less than 750 nm and not more than 10,000 nm.

(Measurement of the Particle Size)

The particle size D50 of the particle is, for example, the particle size at a cumulative volume of 50% counted from the side of a particle with a smaller particle size in a particle size distribution measured by the laser diffraction method using particles after the gel electrolyte components etc. are removed from the gel electrolyte layer 56. From the measured particle size distribution mentioned above, the value of the particle size D40 at a cumulative volume of 40% and the value of the particle size D60 at a cumulative volume of 60% can be obtained.

The shape of the particle is typically a spherical shape, a flat shape (occasionally referred to as flat) such as a plate-like shape such as a scale-like shape or a flake-like shape, or a needle-like shape, or the like, for example, but is not limited to them. As the shape of the particle, from the viewpoint of allowing the light scattering at the particle boundary to be reduced more and allowing the transparency to be improved more, aspherical shapes other than spherical shapes are preferable, and among the aspherical shapes, a flat shape such as a plate-like shape such as a scale-like shape or a flake-like shape, or a needle-like shape is more preferable. As the particle, from the viewpoint of allowing the transparency to be improved more, a particle made of a single crystal or a small number of single crystals is preferable to a polycrystal or a secondary particle, i.e. an aggregate of primary particles, which is likely to be a spherical shape. The spherical shape includes not only a regular spherical shape but also a shape in which a regular spherical shape is made slightly flat or distorted, a shape in which unevenness is formed on the surface of a regular spherical shape, a shape in which these shapes are combined, and the like. The flat shape refers to a particle in which the ratio between the long side of the particle and the short side of the particle (long side/short side) is 2/1 or more. The value thereof can be read from, for example, an enlarged image of the particle captured with a scanning electron microscope (SEM). The plate-like shape such as a scale-like shape or a flake-like shape, and the needle-like shape are a kind of flat shape; and a thin, flat shape is referred to as the plate-like shape, and a thin, long shape like a needle is referred to as the needle-like shape. The scale-like shape and the flake-like shape are a kind of plate-like shape.

The inventors of the present application made extensive research and have found that, in the case where a particle in a flat shape out of these shapes is selected, transparency can be kept more when at least one of the maximum value and the minimum value of the projection dimensions from every side of the particle falls within the range mentioned above (not less than 50 nm and not more than 450 nm, or not less than 750 nm and not more than 10,000 nm). For example, in the case of a plate-like shape, it is preferable that the maximum length of the major surface be in the range of not less than 750 nm and not more than 10,000 nm, and the thickness be in the range of not less than 50 nm and not more than 450 nm. In the case of a needle-like shape, light scattering is limited when the length is in the range of not less than 750 nm and not more than 10,000 nm, and the thickness is in the range of not less than 50 nm and not more than 450 nm. On the other hand, a situation in which a spherical particle having a diameter of, for example, not less than 350 nm and not more than 850 nm, which is the visible light wavelength range, is contained is presumed to be most suitable to make a balance among the viscosity of the coating material, the reduction of the influence on the battery characteristics, and the improvement in the strength with the electrolyte. Thus, in order to bring the volume per particle into the same range as that of the spherical particle having a diameter in the range mentioned above, a plate-like or needle-like particle in the projection dimension range mentioned above may be selected, and this is suitable to obtain transparency without losing the balance.

(Refractive Index of the Particle)

The refractive index of the particle is not less than 1.3 and less than 2.4, preferably not less than 1.3 and not more than 2.1, from the viewpoint of suppressing light scattering to allow the transparency of the gel electrolyte layer 56 to be ensured. This is in order to suppress the decrease in transparency due to scattering caused by the refraction of light derived from the difference in refractive index between the gel electrolyte and the particle (a difference that solids have higher refractive indices and liquids have lower refractive indices).

Among the particles, i.e. a solid, a particle with a relatively low refractive index in the range of not less than 1.3 and less than 2.4, preferably not less than 1.3 and not more than 2.1, is used in order to bring the refractive index of the particle, i.e. a solid, close to the refractive index of the gel electrolyte, which is relatively low due to the electrolyte solution, i.e. a liquid, being contained.

As the particles, for example, at least one of inorganic particles and organic particles, etc. may be used. As the inorganic particle, for example, a particle of a metal oxide, a sulfate compound, a carbonate compound, a metal hydroxide, a metal carbide, a metal nitride, a metal fluoride, a phosphate compound, a mineral, or the like may be given. As the particle, a particle having electrically insulating properties is typically used, and also a particle (minute particle) in which the surface of a particle (minute particle) of an electrically conductive material is subjected to surface treatment with an electrically insulating material or the like and is thus provided with electrically insulating properties may be used.

As the metal oxide, silicon oxide ($SiO_2$, silica (silica stone powder, quartz glass, glass beads, diatomaceous earth, a wet or dry synthetic product, or the like; colloidal silica being given as the wet synthetic product, and fumed silica being given as the dry synthetic product)), zinc oxide (ZnO), tin oxide (SnO), magnesium oxide (magnesia, MgO), antimony oxide ($Sb_2O_3$), aluminum oxide (alumina, $Al_2O_3$), or the like may be preferably used.

As the sulfate compound, magnesium sulfate ($MgSO_4$), calcium sulfate ($CaSO_4$), barium sulfate ($BaSO_4$), strontium sulfate ($SrSO_4$), or the like may be preferably used. As the carbonate compound, magnesium carbonate ($MgCO_3$, magnesite), calcium carbonate ($CaCO_3$, calcite), barium carbonate ($BaCO_3$), lithium carbonate ($Li_2CO_3$), or the like may be preferably used. As the metal hydroxide, magnesium hydroxide ($Mg(OH)_2$, brucite), aluminum hydroxide (Al (OH)$_3$, (bayerite or gibbsite)), zinc hydroxide (Zn(OH)$_2$), or the like, an oxide hydroxide or a hydrated oxide such as boehmite (Al$_2$O$_3$H$_2$O or AlOOH, diaspore), white carbon (SiO$_2$.nH$_2$O, silica hydrate), zirconium oxide hydrate (ZrO$_2$.nH$_2$O (n=0.5 to 10)), or magnesium oxide hydrate (MgO$_a$.mH$_2$O (a=0.8 to 1.2, m=0.5 to 10)), a hydroxide hydrate such as magnesium hydroxide octahydrate, or the like may be preferably used. As the metal carbide, boron carbide (B$_4$C) or the like may be preferably used. As the metal nitride, silicon nitride (Si$_3$N$_4$), boron nitride (BN), aluminum nitride (AlN), titanium nitride (TiN), or the like may be preferably used.

As the metal fluoride, lithium fluoride (LiF), aluminum fluoride (AlF$_3$), calcium fluoride (CaF$_2$), barium fluoride (BaF$_2$), magnesium fluoride, or the like may be preferably used. As the phosphate compound, trilithium phosphate (Li$_3$PO$_4$), magnesium phosphate, magnesium hydrogen phosphate, ammonium polyphosphate, or the like may be preferably used.

As the mineral, a silicate mineral, a carbonate mineral, an oxide mineral, or the like is given. The silicate mineral is categorized on the basis of the crystal structure into nesosilicate minerals, sorosilicate minerals, cyclosilicate minerals, inosilicate minerals, layered (phyllo) silicate minerals, and tectosilicate minerals. There are also minerals categorized as fibrous silicate minerals called asbestos according to a different categorization criterion from the crystal structure.

The nesosilicate mineral is an isolated tetrahedral silicate mineral formed of independent Si—O tetrahedrons ([SiO$_4$]$^{4-}$). As the nesosilicate mineral, one that falls under olivines or garnets, or the like is given. As the nesosilicate mineral, more specifically, an olivine (a continuous solid solution of Mg$_2$SiO$_4$ (forsterite) and Fe$_2$SiO$_4$ (fayalite)), magnesium silicate (forsterite, Mg$_2$SiO$_4$), aluminum silicate (Al$_2$SiO$_5$; sillimanite, andalusite, or kyanite), zinc silicate (willemite, Zn$_2$SiO$_4$), zirconium silicate (zircon, ZrSiO$_4$), mullite (3Al$_2$O$_3$.2SiO$_2$ to 2Al$_2$O$_3$.SiO$_2$), or the like is given.

The sorosilicate mineral is a group-structured silicate mineral formed of composite bond groups of Si—O tetrahedrons ([Si$_2$O$_7$]$^{6-}$ or [Si$_5$O$_{16}$]$^{12-}$). As the sorosilicate mineral, one that falls under vesuvianite or epidotes, or the like is given.

The cyclosilicate mineral is a ring-shaped silicate mineral formed of ring-shaped bodies of finite (3 to 6) bonds of Si—O tetrahedrons ([Si$_3$O$_9$]$^{6-}$, [Si$_4$O$_{12}$]$^{8-}$, or [Si$_6$O$_{18}$]$^{12-}$). As the cyclosilicate mineral, beryl, tourmalines, or the like is given.

The inosilicate mineral is a fibrous silicate mineral having a chain-like form ([Si$_2$O$_6$]$^{4-}$) and a band-like form ([Si$_3$O$_9$]$^{6-}$, [Si$_4$O$_{11}$]$^{6-}$, [Si$_5$O$_{15}$]$^{10-}$ or [Si$_7$O$_{21}$]$^{14-}$) in which the linkage of Si—O tetrahedrons extends infinitely. As the inosilicate mineral, for example, one that falls under pyroxenes such as calcium silicate (wollastonite, CaSiO$_3$), one that falls under amphiboles, or the like is given.

The layered silicate mineral is a layer-like silicate mineral having network bonds of Si—O tetrahedrons ([SiO$_4$]$^{4-}$). Specific examples of the layered silicate mineral are described later.

The tectosilicate mineral is a silicate mineral of a three-dimensional network structure in which Si—O tetrahedrons ([SiO$_4$]$^{4-}$) form three-dimensional network bonds. As the tectosilicate mineral, quartz, feldspars, zeolites, or the like, an aluminosilicate (aM$_2$O.bAl$_2$O$_3$.cSiO$_2$.dH$_2$O; M being a metal element; a, b, c, and d each being an integer of 1 or more) such as a zeolite (M$_{2/n}$O.Al$_2$O$_3$.xSiO$_2$.yH$_2$O; M being a metal element; n being the valence of M; x≥2; y≥0), or the like is given.

As the asbestos, chrysotile, amosite, anthophyllite, or the like is given.

As the carbonate mineral, dolomite (CaMg(CO$_3$)$_2$), hydrotalcite (Mg$_6$Al$_2$(CO$_3$)(OH)$_{16}$.4(H$_2$O)), or the like is given.

As the oxide mineral, spinel (MgAl$_2$O$_4$) or the like is given.

As other minerals, barium titanate (BaTiO$_3$), strontium titanate (SrTiO$_3$), or the like is given. The mineral may be a natural mineral or an artificial mineral.

These minerals include those categorized as clay minerals. As the clay mineral, a crystalline clay mineral, an amorphous or quasicrystalline clay mineral, or the like is given. As the crystalline clay mineral, a silicate mineral such as a layered silicate mineral, one having a structure close to a layered silicate, or other silicate minerals, a layered carbonate mineral, or the like is given.

The layered silicate mineral contains a tetrahedral sheet of Si—O and an octahedral sheet of Al—O, Mg—O, or the like combined with the tetrahedral sheet. The layered silicate is typically categorized by the numbers of tetrahedral sheets and octahedral sheets, the number of cations of the octahedrons, and the layer charge. The layered silicate mineral may be also one in which all or part of the metal ions between layers are substituted with an organic ammonium ion or the like, etc.

Specifically, as the layered silicate mineral, one that falls under the kaolinite-serpentine group of a 1:1-type structure, the pyrophyllite-talc group of a 2:1-type structure, the smectite group, the vermiculite group, the mica group, the brittle mica group, the chlorite group, or the like, etc. are given.

As one that falls under the kaolinite-serpentine group, for example, chrysotile, antigorite, lizardite, kaolinite (Al$_2$Si$_2$O$_5$(OH)$_4$), dickite, or the like is given. As one that falls under the pyrophyllite-talc group, for example, talc (Mg$_3$Si$_4$O$_{10}$(OH)$_2$), willemseite, pyrophyllite (Al$_2$Si$_4$O$_{10}$(OH)$_2$), or the like is given. As one that falls under the smectite group, for example, saponite [(Ca/2,Na)$_{0.33}$(Mg,Fe$^{2+}$)$_3$(Si,Al)$_4$O$_{10}$(OH)$_2$.4H$_2$O], hectorite, sauconite, montmorillonite {(Na,Ca)$_{0.33}$(Al,Mg)2Si$_4$O$_{10}$(OH)$_2$.nH$_2$O; a clay containing montmorillonite as a main component is called bentonite}, beidellite, nontronite, or the like is given. As one that falls under the mica group, for example, muscovite (KAl$_2$(AlSi$_3$)O$_{10}$(OH)$_2$), sericite, phlogopite, biotite, lepidolite (lithia mica), or the like is given. As one that falls under the brittle mica group, for example, margarite, clintonite, anandite, or the like is given. As one that falls under the chlorite group, for example, cookeite, sudoite, clinochlore, chamosite, nimite, or the like is given.

As one having a structure close to the layered silicate, a hydrous magnesium silicate having a 2:1 ribbon structure in which a sheet of tetrahedrons arranged in a ribbon configuration is linked to an adjacent sheet of tetrahedrons arranged in a ribbon configuration while inverting the apices, or the like is given. As the hydrous magnesium silicate, sepiolite (Mg$_9$Si$_{12}$O$_{30}$(OH)$_6$(OH$_2$)$_4$.6H$_2$O), palygorskite, or the like is given.

As other silicate minerals, a porous aluminosilicate such as a zeolite (M$_{2/n}$O.Al$_2$O$_3$.xSiO$_2$.yH$_2$O; M being a metal element; n being the valence of M; x≥2; y≥0), attapulgite [(Mg,Al)2Si$_4$O$_{10}$(OH).6H$_2$O], or the like is given.

As the layered carbonate mineral, hydrotalcite (Mg$_6$Al$_2$(CO$_3$)(OH)$_{16}$. 4(H$_2$O)) or the like is given.

As the amorphous or quasicrystalline clay mineral, hisingerite, imogolite (Al$_2$SiO$_3$(OH)), allophane, or the like is given.

These inorganic particles may be used singly, or two or more of them may be mixed for use. The inorganic particle has also oxidation resistance; and when the gel electrolyte layer 56 is provided between the positive electrode 53 and the separator 55, the inorganic particle has strong resistance to the oxidizing environment near the positive electrode during charging.

The particle may be also an organic particle. As the material that forms the organic particle, melamine, melamine cyanurate, melamine polyphosphate, cross-linked polymethyl methacrylate (cross-linked PMMA), polyethylene, polypropylene, polystyrene, polytetrafluoroethylene, polyvinylidene difluoride, a polyamide, a polyimide, a melamine resin, a phenol resin, an epoxy resin, or the like is given. These materials may be used singly, or two or more of them may be mixed for use.

(Mass Ratio Between the Particles and the Resin)

The mass ratio (mixing ratio) between the particles and the resin is, in terms of the mass ratio of (particles/resin), preferably in the range of particles/resin=not less than 15/85 and not more than 90/10 from the viewpoint of ensuring transparency, and more preferably in the range of not less than 15/85 and not more than 80/20 from the viewpoint of improving the transparency more. Although it is preferable for the ratio of the particles to be lower from the viewpoint of ensuring the transparency of the gel electrolyte layer 56, an excessively low ratio of the particles causes the strength of the gel electrolyte layer 56 to tend to be reduced; thus, the lower limit value of the mass ratio mentioned above is set.

(Mass Ratio Between the Particles and the Electrolyte Salt)

The mass ratio (mixing ratio) between the particles and the electrolyte salt is, in terms of the mass ratio of (particles/electrolyte salt), preferably in the range of particles/electrolyte salt=not less than 15/85 and not more than 90/10 from the viewpoint of ensuring transparency, and more preferably in the range of not less than 15/85 and not more than 80/20 from the viewpoint of improving the transparency more. Although it is preferable for the ratio of the particles to be lower from the viewpoint of ensuring the transparency of the gel electrolyte layer 56, an excessively low ratio of the particles causes the strength of the gel electrolyte layer 56 to tend to be reduced; thus, the lower limit value of the mass ratio mentioned above is set.

In the present technology, at least one of the mass ratio (particles/resin) and the mass ratio (particles/electrolyte salt) is set in the range mentioned above (not less than 15/85 and not more than 90/10) from the viewpoint of improving the transparency of the gel electrolyte layer 56. When one of the mass ratio (particles/resin) and the mass ratio (particles/electrolyte salt) is set in the range mentioned above, the transparency of the gel electrolyte layer 56 can be ensured. It is preferable that both of the mass ratio (particles/resin) and the mass ratio (particles/electrolyte salt) be set in the range mentioned above, because the transparency can be improved more.

(Amount of Particles Contained)

The amount of particles contained is preferably not less than 5.2 mass % and not more than 50.0 mass %, more preferably not less than 5.2 mass % and not more than 30.8 mass %, relative to the mass of the electrolyte from the viewpoint of bringing the refractive index of the gel electrolyte close to that of the particle and allowing the transparency to be improved more.

(Amount of the Resin Contained)

The amount of the resin contained is preferably not less than 5.6 mass % and not more than 30.8 mass %, more preferably not less than 7.7 mass % and not more than 30.8 mass %, relative to the mass of the electrolyte from the viewpoint of bringing the refractive index of the gel electrolyte close to that of the particle and allowing the transparency to be improved more. When the amount of the resin contained is larger than 30.8 mass %, the ion transfer resistance of the battery is increased and the output tends to be reduced.

(Amount of the Electrolyte Salt Contained)

The amount of the electrolyte salt contained is preferably not less than 5.6 mass % and not more than 30.8 mass %, more preferably not less than 7.7 mass % and not more than 30.8 mass %, relative to the mass of the electrolyte from the viewpoint of bringing the refractive index of the gel electrolyte close to that of the filler particle and allowing the transparency to be improved more. When the amount of the electrolyte salt contained is larger than 30.8 mass %, the ion transfer resistance of the battery is increased and the output tends to be reduced.

[Method for Manufacturing the Nonaqueous Electrolyte Battery]

The nonaqueous electrolyte battery 62 can be manufactured in the following manner, for example.

[Method for Manufacturing the Positive Electrode]

A positive electrode active material, an electrically conductive agent, and a binder are mixed together to prepare a positive electrode mixture, and the positive electrode mixture is dispersed in a solvent such as N-methyl-2-pyrrolidone to prepare a paste-like positive electrode mixture slurry. Next, the positive electrode mixture slurry is applied to the positive electrode current collector 53A, the solvent is dried, and compression molding is performed with a roll press machine or the like to form the positive electrode active material layer 53B; thus, the positive electrode 53 is fabricated.

[Method for Manufacturing the Negative Electrode]

A negative electrode mixture is prepared by mixing a negative electrode active material and a binder, and a paste-form negative electrode mixture slurry is prepared by dispersing this negative electrode mixture in a solvent such as N-methyl-2-pyrrolidone. Next, the negative electrode mixture slurry is applied on the negative electrode current collector 54A, the solvent is dried, and the dried mixture is compression molded with a rolling press machine or the like, so that the negative electrode active material layer 54B is formed and the negative electrode 54 is fabricated.

[Preparation of the Nonaqueous Electrolyte Solution]

The nonaqueous electrolyte solution is prepared by dissolving an electrolyte salt in a nonaqueous solvent.

[Assembly of the Nonaqueous Electrolyte Battery]

A precursor solution (coating material) containing a nonaqueous electrolyte solution, a resin, a filler, and a diluting solvent (dimethyl carbonate or the like) is applied to both surfaces of at least one of the positive electrode 53 and the negative electrode 54, and the diluting solvent is volatilized to form the gel electrolyte layer 56. After that, the positive electrode lead 51 is attached to an end portion of the positive electrode current collector 53A by welding, and the negative electrode lead 52 is attached to an end portion of the negative electrode current collector 54A by welding.

Next, the positive electrode 53 on which the gel electrolyte layer 56 is formed and the negative electrode 54 on which the gel electrolyte layer 56 is formed are stacked via the separator 55 to form a stacked body, then the stacked body is wound in its longitudinal direction, and the protection tape 57 is stuck to the outermost peripheral portion; thus, the wound electrode body 50 is formed.

The wound electrode body 50 may be formed also in the following manner. The precursor solution is applied to at least one of both surfaces of the separator 55, and then the diluting solvent is volatilized. Thereby, the gel electrolyte layer 56 is formed on both surfaces of the separator 55. The positive electrode lead 51 is attached to an end portion of the positive electrode current collector 53A by welding, and the negative electrode lead 52 is attached to an end portion of the negative electrode current collector 54A by welding, in advance. The positive electrode 53 and the negative electrode 54 are stacked via the separator 55, on both surfaces of which the gel electrolyte layer 56 is formed, to form a stacked body, and then the stacked body is wound in its longitudinal direction; thus, the wound electrode body 50 is obtained.

The accuracy of the clearance between each two of the end of the positive electrode 53, the end of the negative electrode 54, and the end of the separator 55 to the appropriate clearance is kept high by accurately grasping the end portions of the electrodes etc. with a photographing means such as a camera during the formation of the wound electrode body 50; hence, it is desired for the gel electrolyte layer 56 to be transparent.

For example, the stacking and winding of the positive electrode 53, the negative electrode 54, and the separator 55 during the formation of the wound electrode body 50 are typically performed by, for example, stacking and winding the positive electrode 53, the negative electrode 54, and the separator 55 with a winding apparatus (winder). At this time, a camera is installed in the winding apparatus to photograph the situation during winding (for example, for each rotation, or the like), and the photographed image data are sent to an image processing apparatus. In the image processing apparatus, image processing is performed to detect the position data of the edge of each electrode and/or the separator, and based on, for example, the difference between the position data of the edges of members etc., it is detected whether a winding deviation has occurred between two of the positive electrode 53, the negative electrode 54, and the separator 55 or not. When it is assessed that there is a winding deviation, the result is fed back to the winding unit of the winding apparatus, and the winding unit of the winding apparatus is controlled so that the edge positions of the positive electrode 53, the negative electrode 54, and the separator 55 coincide with the correct edge positions.

In this case, the photographing of the end portion of the application object by the photographing means such as a camera is performed through the gel electrolyte layer 56 formed on the application object (the positive electrode 53, the negative electrode 54, or the separator 55). Hence, if the gel electrolyte layer 56 is not transparent, the edge position of the application object will not be detected satisfactorily, and consequently a winding deviation will occur. For example, when the detection of the edge position is performed only on one side on either one side serving as a reference and a winding deviation occurs due to false detection, the edges of the positive and negative electrodes on the opposite side to the one side serving as a reference may protrude from the separator, and a short circuit may occur. In contrast, in the present technology, since the gel electrolyte layer 56 formed on the application object is transparent, a situation in which the edge position of the application object is not detected satisfactorily can be avoided, and the occurrence of a winding deviation can be suppressed. Thus, the defect of a short circuit due to a winding deviation of the battery can be avoided, and safety can be ensured.

Finally, for example, the wound electrode body 50 is interposed between the components of the package member 60, and the outer edge portions of the components of the package member 60 are stuck together and sealed up by thermal fusion bonding or the like. At this time, the adhesive film 61 is inserted between the positive electrode lead 51 and the negative electrode lead 52 and the package member 60. Thus, the nonaqueous electrolyte battery 62 shown in FIG. 1 and FIG. 2 is completed.

(1-2) Second Example

Figure 3A:
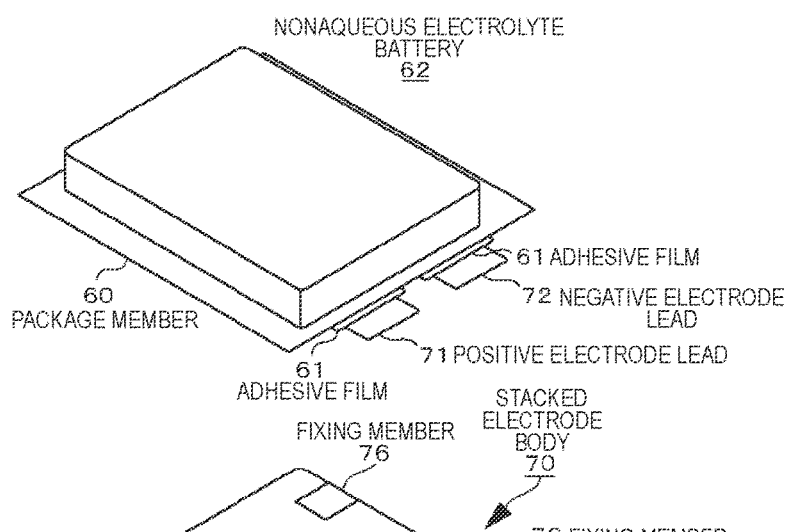
FIG. 3A to FIG. 3C are disassembled perspective views showing the configuration of a nonaqueous electrolyte battery of a laminated film type using a stacked electrode body.
Figure 3B:
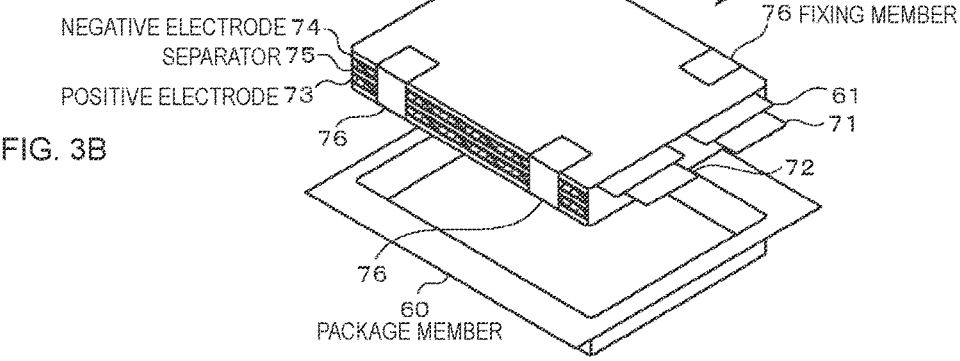
Figure 3C:
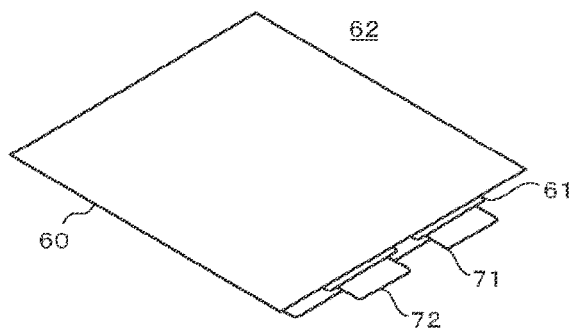

In the first example described above, a nonaqueous electrolyte battery 62 in which the wound electrode body 50 is packaged with the package member 60 is described; but as shown in FIG. 3A to FIG. 3C, a stacked electrode body 70 may be used in place of the wound electrode body 50. FIG. 3A is an external appearance view of a nonaqueous electrolyte battery 62 in which the stacked electrode body 70 is housed. FIG. 3B is a disassembled perspective view showing the way in which the stacked electrode body 70 is housed in the package member 60. FIG. 3C is an external appearance view showing the external appearance of the nonaqueous electrolyte battery 62 shown in FIG. 3A as viewed from the bottom surface side.

As the stacked electrode body 70, a stacked electrode body 70 in which a rectangular positive electrode 73 and a rectangular negative electrode 74 are stacked via a rectangular separator 75 and fixed by a fixing member 76 is used. Although the illustration is omitted, a gel electrolyte layer is provided so as to be in contact with the positive electrode 73 and the negative electrode 74. For example, a gel electrolyte layer (illustration omitted) is provided between the positive electrode 73 and the separator 75 and between the negative electrode 74 and the separator 75. The gel electrolyte layer is similar to the gel electrolyte layer 56 of the first example. A positive electrode lead 71 connected to the positive electrode 73 and a negative electrode lead 72 connected to the negative electrode 74 are led out from the stacked electrode body 70, and the adhesive film 61 is provided between the positive electrode lead 71 and the negative electrode lead 72 and the package member 60.

Although the illustration is omitted, like in the first example, the positive electrode 73, the negative electrode 74, and the separator 75 are stacked via a gel electrolyte layer (illustration omitted) formed between each two of them in such a manner that the spacing between each two of the ends of the four sides of the rectangular positive electrode 73, the ends of the four sides of the negative electrode 74 having rectangle shape, and the ends of the four sides of the rectangular separator 75 has a prescribed clearance. The gel electrolyte layer covers at least part of the peripheral edge surface of the positive electrode 73 and at least part of the peripheral edge surface of the negative electrode 74.

The method for forming the gel electrolyte layer and the method of the thermal fusion bonding of the package member 60 are similar to those of the first example. Like in the first example, when the gel electrolyte layer 56 is not transparent during the formation of the stacked electrode body 70, the edge position will not be detected satisfactorily, and consequently a stacking deviation will occur. For example, when the detection of the edge position is performed only on two adjacent sides serving as a reference and a stacking deviation occurs due to false detection, the edges of the positive and negative electrodes on the opposite side to the two adjacent sides serving as a reference may protrude from the separator, and a short circuit may occur. In contrast, in the present technology, since the gel electrolyte layer formed on the application object (the electrode or the separator 75) is transparent, a situation in which the edge of the application object (the electrode or the separator 75) is not detected satisfactorily can be avoided, and the occurrence of a deviation in the clearance between each two of the edges of the positive electrode 73, the negative electrode 74, and the separator 75 (stacking deviation) can be suppressed. Thus, the defect of a short circuit of the battery can be avoided, and safety can be ensured.

2. Second Embodiment

In a second embodiment, an example of a battery pack of a laminated film-type battery (a nonaqueous electrolyte battery) that includes a gel electrolyte layer similar to that of the first embodiment is described.

The battery pack is a simplified battery pack (also referred to as a soft pack). The simplified battery pack is installed in an electronic device; and in the simplified battery pack, a battery cell, a protection circuit, etc. are fixed by an insulating tape or the like, and part of the battery cell is exposed and provided with an output such as a connector connected to the main body of the electronic device.

Figure 5A:
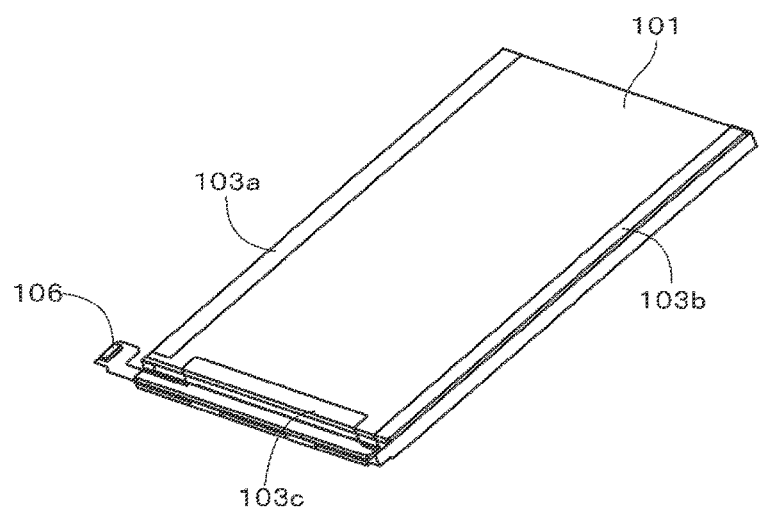
FIG. 5A is a schematic perspective view showing the external appearance of the simplified battery pack.

An example of the configuration of the simplified battery pack will now be described. FIG. 4 is a disassembled perspective view showing a configuration example of the simplified battery pack. FIG. 5A is a schematic perspective view showing the external appearance of the simplified battery pack, and FIG. 5B is a schematic perspective view showing the external appearance of the simplified battery pack.

Figure 5B:
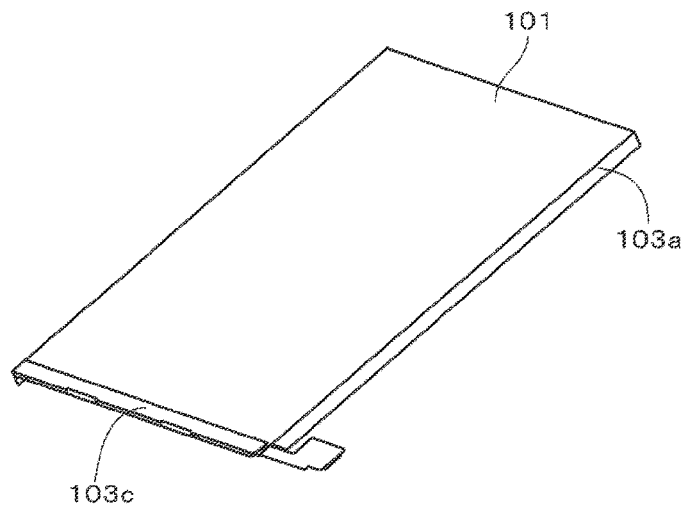
FIG. 5B is a schematic perspective view showing the external appearance of the simplified battery pack.

As shown in FIG. 4, FIG. 5A, and FIG. 5B, the simplified battery pack includes a battery cell 101, leads 102a and 102b led out from the battery cell 101, insulating tapes 103a to 103c, an insulating plate 104, a circuit substrate 105 on which a protection circuit (protection circuit module (PCM)) is formed, and a connector 106. The battery cell 101 is, for example, similar to the nonaqueous electrolyte secondary battery according to the first embodiment.

The insulating plate 104 and the circuit substrate 105 are placed in a terrace portion 101a at the front end of the battery cell 101, and the lead 102a and the lead 102b led out from the battery cell 101 are connected to the circuit substrate 105.

The connector 106 for output is connected to the circuit substrate 105. Members such as the battery cell 101, the insulating plate 104, and the circuit substrate 105 are fixed by sticking the insulating tapes 103a to 103c to prescribed places.

3. Third Embodiment

Figure 6:
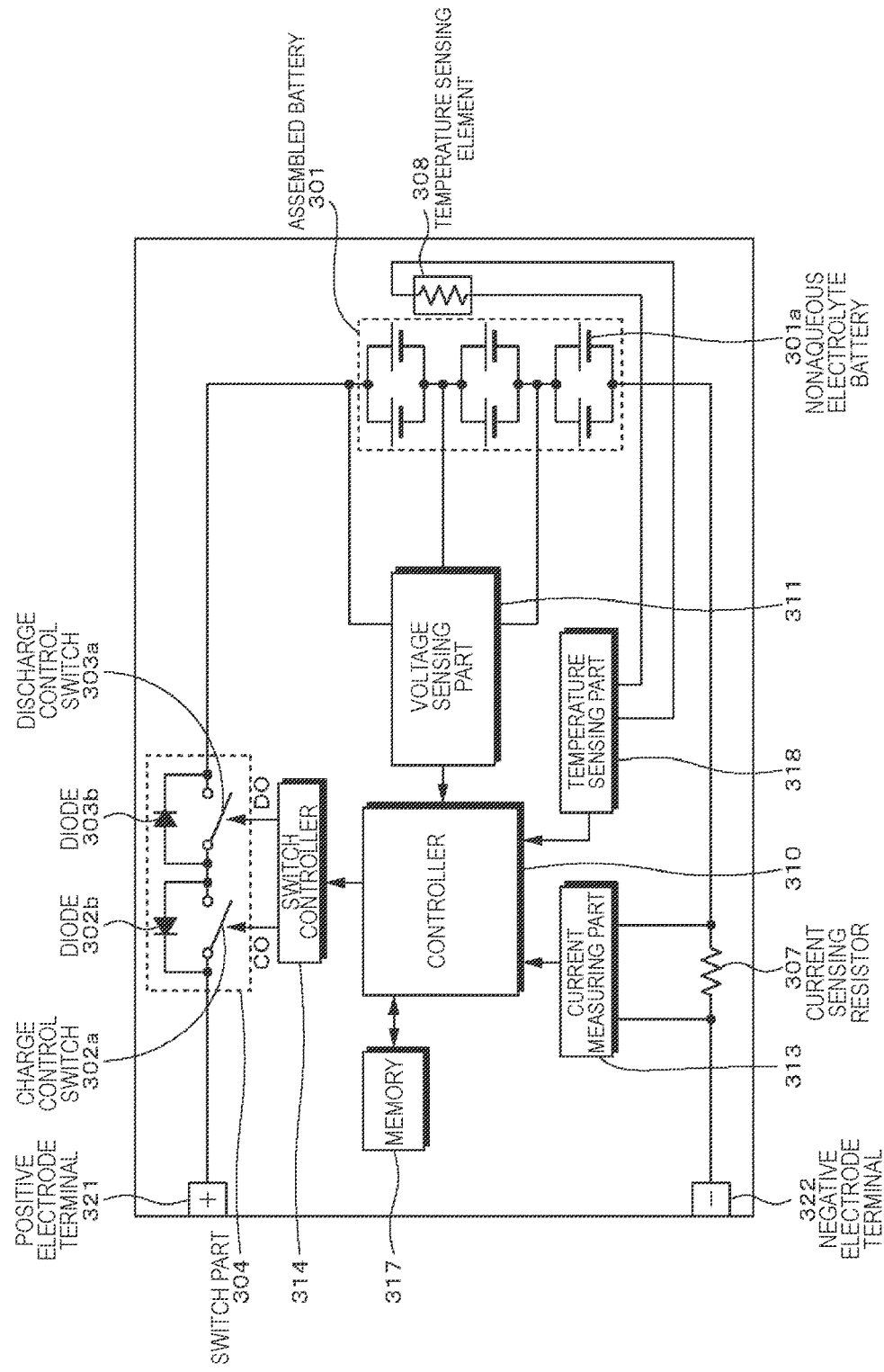
FIG. 6 is a block diagram showing a circuit configuration example of a battery pack according to an embodiment of the present technology.

FIG. 6 is a block diagram showing a circuit configuration example when the battery according to the first embodiment of the present technology (hereinafter, referred to as a secondary battery as appropriate) is used for a battery pack. The battery pack includes an assembled battery 301, a package, a switch part 304 including a charge control switch 302a and a discharge control switch 303a, a current sensing resistor 307, a temperature sensing element 308, and a controller 310.

Further, the battery pack includes a positive electrode terminal 321 and a negative electrode lead 322, and at the time of charge, the positive electrode terminal 321 and the negative electrode lead 322 are connected to a positive electrode terminal and a negative electrode terminal of a battery charger, respectively, and charge is performed. Further, at the time of using an electronic device, the positive electrode terminal 321 and the negative electrode lead 322 are connected to a positive electrode terminal and a negative electrode terminal of the electronic device, respectively, and discharge is performed.

The assembled battery 301 is formed by connecting a plurality of secondary batteries 301a in series and/or in parallel. Each of the secondary batteries 301a is the secondary battery according to an embodiment of the present technology. Note that although FIG. 6 shows an example in which six secondary batteries 301a are connected so as to have two parallel connections and three series connections (2P3S), any other connection can be adopted such as n parallel and m series (n and m are integers) connections.

The switch part 304 includes the charge control switch 302a, a diode 302b, the discharge control switch 303a, and a diode 303b, and is controlled by the controller 310. The diode 302b has a polarity that is reverse to charge current flowing in the direction from the positive electrode terminal 321 to the assembled battery 301 and forward to discharge current flowing in the direction from the negative electrode lead 322 to the assembled battery 301. The diode 303b has a polarity that is forward to the charge current and reverse to the discharge current. Note that although an example is shown in which the switch part 304 is provided on a plus side, the switch part 304 may be provided on a minus side.

The charge control switch 302a is turned off when the battery voltage is an overcharge detection voltage and is controlled by a charge/discharge controller so that charge current does not flow into a current path of the assembled battery 301. After the charge control switch 302a is turned off, only discharge is possible via the diode 302b. Further, when overcurrent flows during charge, the charge control switch 302a is turned off and controlled by the controller 310 so that charge current flowing in the current path of the assembled battery 301 is cut off.

The discharge control switch 303a is turned off when the battery voltage is an overdischarge detection voltage and is controlled by the controller 310 so that discharge current does not flow into the current path of the assembled battery 301. After the discharge control switch 303a is turned off, only charge is possible via the diode 103b. Further, when overcurrent flows during discharge, the discharge control switch 303a is turned off and controlled by the controller 310 so that discharge current flowing in the current path of the assembled battery 301 is cut off.

The temperature sensing element 308 is a thermistor for example, and is provided near the assembled battery 301, measures the temperature of the assembled battery 301, and supplies the measured temperature to the controller 310. A voltage sensing part 311 measures the voltage of the assembled battery 301 and of each secondary battery 301a forming the assembled battery 301, A/D converts the measured voltage, and supplies the voltage to the controller 310. A current measuring part 313 measures current with the current sensing resistor 307, and supplies the measured current to the controller 310.

A switch controller 314 controls the charge control switch 302a and the discharge control switch 303a of the switch part 304, based on the voltage and current input from the voltage sensing part 311 and the current measuring part 313. When the voltage of any of the secondary batteries 301a is the overcharge detection voltage or lower or the overdischarge detection voltage or lower, or when overcurrent flows rapidly, the switch controller 314 transmits a control signal to the switch part 304 to prevent overcharge, overdischarge, and overcurrent charge/discharge.

Here, when, for example, the secondary battery is a lithium ion secondary battery, the overcharge detection voltage is set to, for example, 4.20 V±0.05 V, and the overdischarge detection voltage is set to, for example, 2.4 V±0.1 V.

As a charge/discharge switch, for example, a semiconductor switch such as a MOSFET can be used. In this case, a parasitic diode of the MOSFET serves as the diodes 302$b$ and 303$b$. In a case where a p-channel FET is used as the charge/discharge switch, the switch controller 314 supplies a control signal DO and a control signal CO to a gate of the charge control switch 302$a$ and a gate of the discharge control switch 303$a$, respectively. In the case of the p-channel type, the charge control switch 302$a$ and the discharge control switch 303$a$ are turned on at a gate potential which is lower than a source potential by a predetermined value or more. That is, in normal charge and discharge operations, the charge control switch 302$a$ and the discharge control switch 303$a$ are made to be in an ON state by setting the control signals CO and DO to low levels.

Further, when performing overcharge or overdischarge, for example, the charge control switch 302$a$ and the discharge control switch 303$a$ are made to be in an OFF state by setting the control signals CO and DO to high levels.

A memory 317 is formed of a RAM or ROM, and is formed of an erasable programmable read only memory (EPROM), which is a volatile memory, for example. The memory 317 stores, in advance, the value calculated in the controller 310, the internal resistance value of the battery in an initial state of each of the secondary batteries 301$a$ measured at a stage in a manufacturing process, and the like, which are rewritable as necessary. Further, by storing a full charge capacity of the secondary battery 301$a$, the memory 317 can calculate the remaining capacity together with the controller 310, for example.

A temperature sensing part 318 measures the temperature with use of the temperature sensing element 308, controls charge/discharge at the time of abnormal heat generation, and corrects the calculation of the remaining capacity.

4. Fourth Embodiment

The battery according to the first embodiment and the battery pack using the same according to the second embodiment and the third embodiment of the present technology described above may be used in order to be installed in or supply electric power to a device such as, for example, an electronic device, an electric vehicle, or a power storage device.

Examples of the electronic device include a laptop personal computer, a PDA (mobile information device), a mobile phone, a cordless extension, a video movie, a digital still camera, an e-book reader, an electronic dictionary, a music player, a radio, a headphone, a game machine, a navigation system, a memory card, a pacemaker, a hearing aid, an electric tool, an electric razor, a refrigerator, an air conditioner, a television set, a stereo, a water heater, a microwave, a dishwasher, a washer, a drier, a lighting device, a toy, a medical device, a robot, a road conditioner, a traffic light, and the like.

Further, examples of the electric vehicle include a railway train, a golf cart, an electric cart, an electric car (including a hybrid car), and the like. The battery according to the first embodiment and the battery pack using the same according to the second embodiment and the third embodiment can be used as a power source for driving these vehicles or as a supplementary power source.

Examples of the power storage device include a power source for power storage for buildings such as houses or for power generation equipment, and the like.

From the above application examples, the following will show a specific example of a power storage system using the power storage device using the battery according to an embodiment of the present technology described above.

This power storage system can have the following structure for example. A first power storage system is a power storage system in which the power storage device is charged with a power generation device which generates power from renewable energy. A second power storage system is a power storage system which includes the power storage device and supplies power to an electronic device connected to the power storage device. A third power storage system is an electronic device which is supplied with power from the power storage device. These power storage systems are each implemented as a system to supply power efficiently in association with an external power supply network.

Further, a fourth power storage system is an electric vehicle including a conversion device which converts power supplied from the power storage device to driving force of a vehicle, and a control device which performs information processing about vehicle control based on information about the power storage device. A fifth power storage system is a power system including a power information transmitting/receiving part which transmits/receives signals to/from other devices via a network, and controls charge/discharge of the power storage device based on information received by the transmitting/receiving part.

(4-1) Home Power Storage System as Application Example

Figure 7:
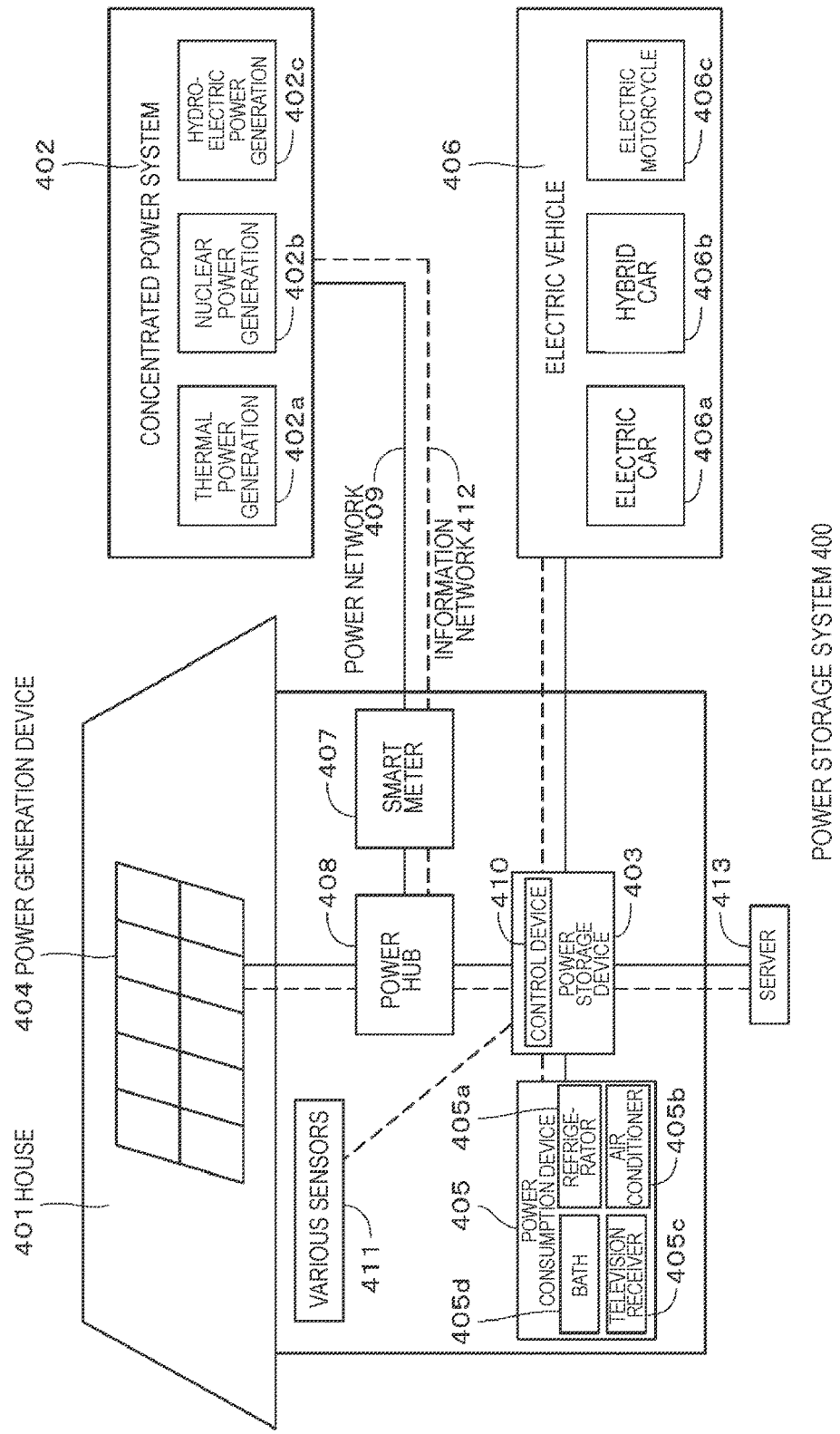
FIG. 7 is a schematic diagram showing an example of the application to a power storage system for a house using a nonaqueous electrolyte battery of the present technology.

An example in which the power storage device using the battery according to an embodiment of the present technology is used for a home power storage system will be described with reference to FIG. 7. For example, in a power storage system 400 for a house 401, power is supplied to the power storage device 403 from a concentrated power system 402 including thermal power generation 402$a$, nuclear power generation 402$b$, hydroelectric power generation 402$c$, and the like, via a power network 409, an information network 412, a smart meter 407, a power hub 408, and the like. Further, power is supplied to the power storage device 403 from an independent power source such as a home power generation device 404. Power supplied to the power storage device 403 is stored, and power to be used in the house 401 is fed with use of the power storage device 403. The same power storage system can be used not only in the house 401 but also in a building.

The house 401 is provided with the power generation device 404, a power consumption device 405, the power storage device 403, a control device 410 which controls each device, the smart meter 407, and sensors 411 which acquires various pieces of information. The devices are connected to each other by the power network 409 and the information network 412. As the power generation device 404, a solar cell, a fuel cell, or the like is used, and generated power is supplied to the power consumption device 405 and/or the power storage device 403. Examples of the power consumption device 405 include a refrigerator 405$a$, an air conditioner 405$b$, a television receiver 405$c$, a bath 405$d$, and the like. Examples of the power consumption device 405 further include an electric vehicle 406 such as an electric car 406*a*, a hybrid car 406*b*, or an electric motorcycle 406*c*.

For the power storage device 403, the battery according to an embodiment of the present technology is used. The battery according to an embodiment of the present technology may be formed of the above-described lithium ion secondary battery for example. Functions of the smart meter 407 include measuring the used amount of commercial power and transmitting the measured used amount to a power company. The power network 409 may be any one or more of DC power supply, AC power supply, and contactless power supply.

Examples of the various sensors 411 include a motion sensor, an illumination sensor, an object detecting sensor, a power consumption sensor, a vibration sensor, a touch sensor, a temperature sensor, an infrared sensor, and the like. Information acquired by the various sensors 411 is transmitted to the control device 410. With the information from the sensors 411, weather conditions, people conditions, and the like are caught, and the power consumption device 405 is automatically controlled so as to make the energy consumption minimum. Further, the control device 410 can transmit information about the house 401 to an external power company via the Internet, for example.

The power hub 408 performs processes such as branching off power lines and DC/AC conversion. Examples of communication schemes of the information network 412 connected to the control device 410 include a method using a communication interface such as UART (Universal Asynchronous Receiver/Transceiver), and a method using a sensor network according to a wireless communication standard such as Bluetooth, ZigBee, or Wi-Fi. A Bluetooth scheme can be used for multimedia communication, and one-to-many connection communication can be performed. ZigBee uses a physical layer of IEEE (Institute of Electrical and Electronics Engineers) 802.15.4. IEEE802.15.4 is the name of a near-field wireless network standard called PAN (Personal Area Network) or W (Wireless) PAN.

The control device 410 is connected to an external server 413. The server 413 may be managed by any of the house 401, an electric company, and a service provider. Examples of information transmitted and received by the server 413 include power consumption information, life pattern information, electric fee, weather information, natural disaster information, and information about power trade. Such information may be transmitted and received by the power consumption device (e.g., the television receiver) in the house, or may be transmitted and received by a device (e.g., a mobile phone) outside the house. Further, such information may be displayed on a device having a display function, such as the television receiver, the mobile phone, or the PDA (Personal Digital Assistant).

The control device 410 controlling each part is configured with a CPU (Central Processing Unit), a RAM (Random Access Memory), a ROM (Read Only Memory), and the like, and is stored in the power storage device 403 in this example. The control device 410 is connected to the power storage device 403, the home power generation device 404, the power consumption device 405, the various sensors 411, and the server 413 via the information network 412, and has a function of adjusting the used amount of commercial power and the power generation amount, for example. Note that the control device 410 may further have a function of performing power trade in the power market.

As described above, power generated by not only the concentrated power system 402 such as the thermal power generation 402*a*, the nuclear power generation 402*b*, and the hydroelectric power generation 402*c*, but also the home power generation device 404 (solar power generation or wind power generation) can be stored in the power storage device 403. Therefore, even when the power generated by the home power generation device 404 varies, the amount of power supplied to the outside can be constant, or only necessary discharge can be controlled. For example, power generated by the solar power generation can be stored in the power storage device 403 and also inexpensive power at midnight can be stored in the power storage device 403 during nighttime, so that power stored in the power storage device 403 can be discharged and used when the power fee is expensive during daytime.

Note that although this example shows the control device 410 housed in the inside of the power storage device 403, the control device 410 may be housed in the inside of the smart meter 407 or configured independently. Further, the power storage system 400 may be used for a plurality of houses in a multiple dwelling house or a plurality of separate houses.

(4-2) Power Storage System in Vehicle as Application Example

Figure 8:
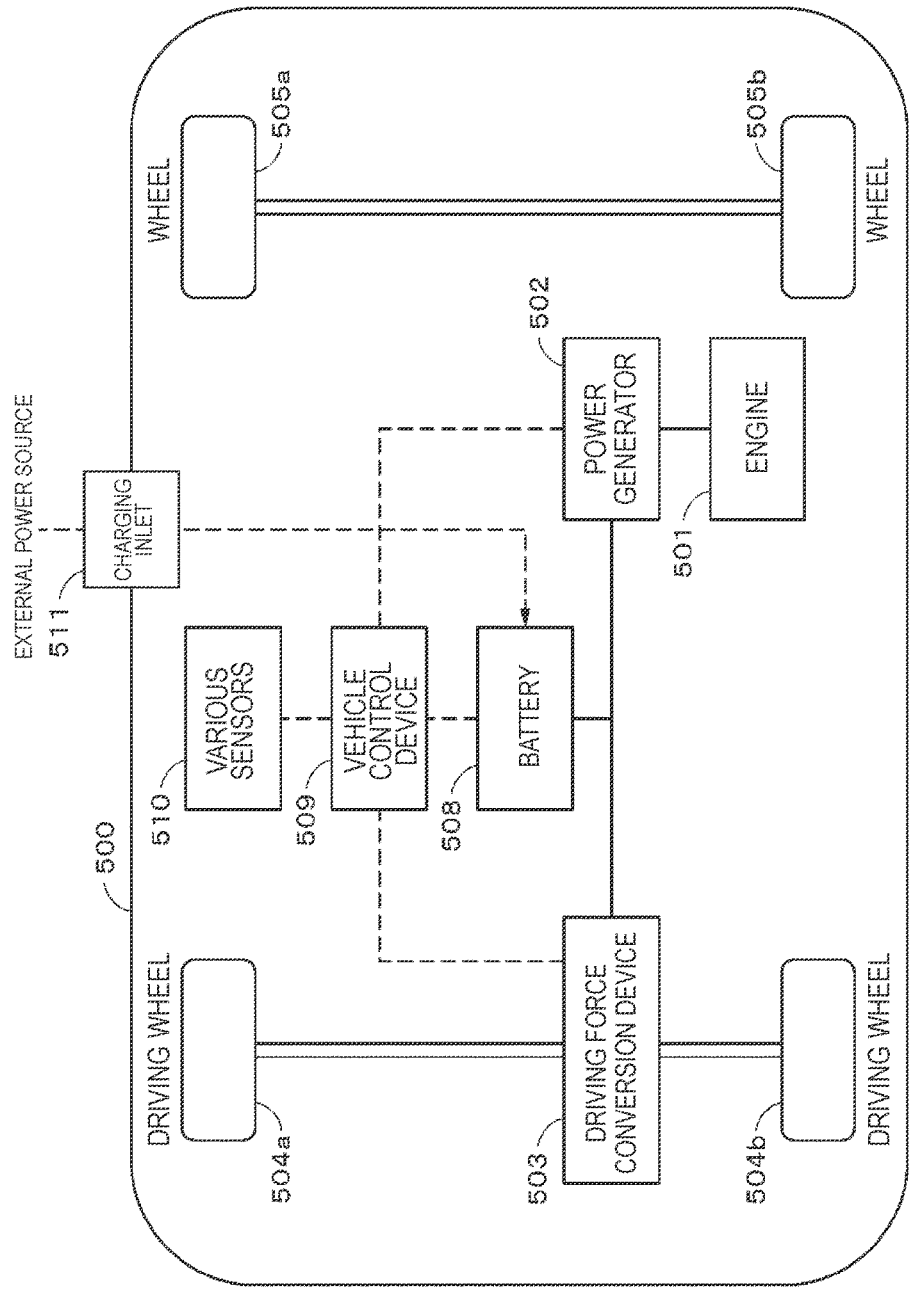
FIG. 8 is a schematic diagram schematically showing an example of the configuration of a hybrid vehicle employing a series hybrid system to which the present technology is applied.

An example in which an embodiment of the present technology is applied to a power storage system for vehicles will be described with reference to FIG. 8. FIG. 8 schematically shows an example of a structure of a hybrid vehicle employing a series hybrid system to which an embodiment of the present technology is applied. The series hybrid system is a car which runs with an electric power/driving force conversion device using power generated by a power generator driven by an engine or power obtained by storing the power in a battery.

A hybrid vehicle 500 incorporates an engine 501, a power generator 502, an electric power/driving force conversion device 503, a driving wheel 504*a*, a driving wheel 504*b*, a wheel 505*a*, a wheel 505*b*, a battery 508, a vehicle control device 509, various sensors 510, and a charging inlet 511. For the battery 508, the battery according to embodiments of the present technology is used.

The hybrid vehicle 500 runs by using the electric power/driving force conversion device 503 as a power source. One of examples of the electric power/driving force conversion device 503 is a motor. Power in the battery 508 drives the electric power/driving force conversion device 503, and the rotating power of the electric power/driving force conversion device 503 is transmitted to the driving wheels 504*a* and 504*b*. Note that by using DC/AC conversion or AC/DC conversion in a necessary portion, an alternate current motor or a direct current motor can be used for the electric power/driving force conversion device 503. The various sensors 510 control the number of engine rotation via the vehicle control device 509 and controls the aperture of an unshown throttle valve (throttle aperture). The various sensors 510 include a speed sensor, an acceleration sensor, a sensor of the number of engine rotation, and the like.

The rotating power of the engine 501 is transmitted to the power generator 502, and power generated by the power generator 502 with the rotating power can be stored in the battery 508.

When the hybrid vehicle 500 reduces the speed with an unshown brake mechanism, the resisting power at the time of the speed reduction is added to the electric power/driving force conversion device 503 as the rotating power, and regenerative power generated by the electric power/driving force conversion device 503 with this rotating power is stored in the battery 508.

The battery 508 can be connected to an external power source of the hybrid vehicle 500, and accordingly, power can be supplied from the external power source by using the charging inlet 511 as an input inlet, and the received power can be stored.

Although not shown, an information processing device which performs information processing about vehicle control based on information about the secondary battery may be provided. Examples of such an information processing device include an information processing device which displays the remaining battery based on information about the remaining battery.

Note that the above description is made by taking an example of the series hybrid car which runs with a motor using power generated by a power generator driven by an engine or power obtained by storing the power in a battery. However, an embodiment of the present technology can also be applied effectively to a parallel hybrid car which uses the output of an engine and a motor as the driving force source and switches three modes as appropriate: driving with the engine only; driving with the motor only; and driving with the engine and the motor. Further, an embodiment of the present technology can also be applied effectively to a so-called electric vehicle which runs by being driven with a driving motor only, without an engine.

EXAMPLES

The present technology will now be described in detail using Examples. The present technology, however, is not limited to the configurations of Examples below.

Example 1-1

Fabrication of a Positive Electrode 91 mass % of lithium cobaltate ($LiCoO_2$), which is the positive electrode active material, 6 mass % of carbon black, which is an electrically conductive agent, and 3 mass % of polyvinylidene difluoride (PVdF), which is a binder, were mixed together to prepare a positive electrode mixture, and the positive electrode mixture was dispersed in N-methyl-2-pyrrolidone (NMP), which is a dispersion medium, to prepare a positive electrode mixture slurry. The positive electrode mixture slurry was applied to both surfaces of a positive electrode current collector formed of a band-like piece of aluminum foil with a thickness of 12 μm in such a manner that part of the positive electrode current collector was exposed. After that, the dispersion medium of the applied positive electrode mixture slurry was evaporated to dryness, and compression molding was performed by roll pressing; thereby, a positive electrode active material layer was formed. Finally, a positive electrode terminal was attached to the exposed portion of the positive electrode current collector; thus, a positive electrode was formed.

[Fabrication of a Negative Electrode]

96 mass % of granular graphite powder with an average particle size of 20 μm, which is the negative electrode active material, 1.5 mass % of an acrylic acid-modified product of a styrene-butadiene copolymer as a binder, and 1.5 mass % of carboxymethyl cellulose as a thickener were mixed together to prepare a negative electrode mixture, and an appropriate amount of water was added and stirring was performed to prepare a negative electrode mixture slurry. The negative electrode mixture slurry was applied to both surfaces of a negative electrode current collector formed of a band-like piece of copper foil with a thickness of 15 μm in such a manner that part of the negative electrode current collector was exposed. After that, the dispersion medium of the applied negative electrode mixture slurry was evaporated to dryness, and compression molding was performed by roll pressing; thereby, a negative electrode active material layer was formed. Finally, a negative electrode terminal was attached to the exposed portion of the negative electrode current collector; thus, a negative electrode was formed.

[Formation of a Gel Electrolyte Layer]

Lithium hexafluorophosphate ($LiPF_6$) as an electrolyte salt was dissolved at a concentration of 1 $mol/dm^3$ in a nonaqueous solvent in which ethylene carbonate (EC), propylene carbonate (PC), and vinylene carbonate (VC) were mixed at a mass ratio of 49:49:2; thereby, a nonaqueous electrolyte solution was prepared.

Subsequently, using polyvinylidene difluoride (PVdF) as the matrix polymer compound (resin) that retains the nonaqueous electrolyte solution, the nonaqueous electrolyte solution, polyvinylidene difluoride, dimethyl carbonate (DMC) as a diluting solvent, and boehmite particles (particle size D50: 1000 nm; refractive index: 1.7; flat particles (plate-like particles)) as a filler were mixed together to prepare a sol-like precursor solution.

The precursor solution is a solution containing the diluting solvent (DMC) equal in mass to the nonaqueous solvent, in addition to the constituent components of the gel electrolyte layer (boehmite particles: 10 mass %; the matrix polymer compound (PVdF): 10 mass %; $LiPF_6$: 10 mass %; the nonaqueous solvent: 70 mass %). The mass ratio between the boehmite particles and the electrolyte salt ($LiPF_6$) (particles/electrolyte salt) is 50/50, and the mass ratio between the boehmite particles and the resin (PVdF) (particles/resin) is 50/50.

Subsequently, the precursor solution was applied to both surfaces of the positive electrode and the negative electrode and drying was performed to remove the diluting solvent (DMC), while the film thickness was adjusted to 5 μm; thereby, a gel electrolyte layer was formed on the surfaces of the positive electrode and the negative electrode.

[Assembly of a Laminated Film-Type Battery]

The positive electrode and the negative electrode, on both surfaces of which the gel electrolyte layer was formed, and a separator were stacked in the order of the positive electrode, the separator, the negative electrode, and the separator, and then a winding apparatus was used to perform winding multiple times in the longitudinal direction, in a flat shape. After that, the winding end portion was fixed by an adhesive tape; thus, a wound electrode body was formed. The positive electrode width was set to 38 mm, the negative electrode width to 40 mm, and the separator width to 42 mm; and the mutual clearance was set to 1 mm. The winding apparatus has the function of sending image data obtained by photographing with a camera to an image processing apparatus, detecting from the image data the positions of the edges of the positive electrode, the separator, and the negative electrode, and feeding back the detection results to control the positions in the width direction of the positive electrode, the separator, and the negative electrode to the correct positions. In the winding apparatus, the detection of the positions of the edges of the positive electrode, the separator, and the negative electrode was performed only on one side on either one side serving as a reference. When a winding deviation occurs due to false detection, the edges of the positive and negative electrodes on the opposite side to the one side serving as a reference may protrude from the separator, and a short circuit may occur.

Next, the wound electrode body was packaged with a laminated film including a soft aluminum layer, and the led-out side of the positive electrode terminal and the negative electrode terminal around the wound electrode body and the other two sides were sealed up and closed tight by thermal fusion bonding under reduced pressure. Thus, the laminated film-type battery shown in FIG. 1 with a battery shape of 4.5 mm in thickness, 30 mm in width, and 50 mm in height was fabricated.

Example 1-2 to Example 1-55

In Example 1-2 to Example 1-55, a laminated film-type battery was fabricated in the same manner as Example 1-1 except that the particle used was changed as shown in Table 1 below.

Examples 1-56 to 1-57

In Example 1-56 to Example 1-57, a laminated film-type battery was fabricated in the same manner as Example 1-1 except that the mass ratio (particles/resin) and the mass ratio (particles/electrolyte salt) were changed as shown in Table 1 below.

Comparative Example 1-1

A laminated film-type battery of Comparative Example 1-1 was fabricated in the same manner as Example 1-1 except that the particle was not mixed in the precursor solution and a gel electrolyte layer not containing the particle was formed.

Comparative Example 1-2 to Comparative Example 1-10

In Comparative Example 1-2 to Comparative Example 1-10, a laminated film-type battery was fabricated in the same manner as Example 1-57 except that the material type of the particle used was changed to a material with a different refractive index or a colored particle, and the shape of the particle was changed to a spherical shape or a polyhedron, as shown in Table 1 below.

Comparative Example 1-11

In Comparative Example 1-11, a laminated film-type battery was fabricated in the same manner as Example 1-56 except that the material type of the particle used was changed to a material with a different refractive index, and the shape of the particle was changed to a polyhedron, as shown in Table 1 below.

Comparative Example 1-12

In Comparative Example 1-12, a positive electrode with a width 6% smaller than the positive electrode width of Example 1-57 was used as the positive electrode. Otherwise, the procedure was the same as Example 1-57, and a laminated film-type battery was fabricated.

Comparative Example 1-13

A laminated film-type battery was fabricated in the same manner as Comparative Example 1-7 except that the mass ratio (particles/resin) and the mass ratio (particles/electrolyte salt) were changed as shown in Table 1 below.

Comparative Example 1-14

A laminated film-type battery was fabricated in the same manner as Example 1-1 except that the mass ratio (particles/resin) and the mass ratio (particles/electrolyte salt) were changed as shown in Table 1 below.

Comparative Example 1-15 to Comparative Example 1-17

A laminated film-type battery was fabricated in the same manner as Example 1-1 except that the particle size of the particle was changed as shown in Table 1 below.

Comparative Example 1-18

A laminated film-type battery was fabricated in the same manner as Comparative Example 1-14 except that the material type of the particle was changed as shown in Table 1 below and the particle size D50 of the particle was changed to 600 nm.

(Particle Size of the Particle and External Appearance of the Gel Electrolyte Layer)

In Examples and Comparative Examples described above, the particle size of the particle and the external appearance of the gel electrolyte layer were measured or evaluated in the following manner (this applies also to Examples and Comparative Examples described later).

(Measurement of the Particle Size)

In a particle size distribution measured by the laser diffraction method using particles after the gel electrolyte components etc. were removed from the gel electrolyte layer, the particle size at a cumulative volume of 50% counted from the side of a particle with a smaller particle size was taken as the particle size D50 of the particle. As necessary, also the value of the particle size D40 at a cumulative volume of 40% or the value of the particle size D60 at a cumulative volume of 60% was obtained from the measured particle size distribution mentioned above.

(External Appearance Evaluation)

The external appearance of the gel electrolyte layer was observed by visual observation. Based on the degree of transparency, a graded evaluation was made in the order of very transparent, transparent, almost transparent, near transparent, and opaque. In each of the cases of very transparent, transparent, almost transparent, and near transparent, the outline of the application object (the electrode or the separator) was able to be visually identified completely through the gel electrolyte layer. In the case of opaque, the outline of the application object (the electrode or the separator) was not able to be visually identified through the gel electrolyte layer 56.

(Battery Evaluation: Winding Deviation Short-Circuit Test)

A short-circuit test for determining whether a short circuit due to a winding deviation had occurred or not was performed in the following manner. For the fabricated battery, the presence or absence of a short circuit due to a winding deviation during the initial charging of the battery was determined. Specifically, a battery in which the decrease in voltage became 0.5 V or more during the period from the completion of the initial charging of the battery until a lapse of 24 hours was assessed as a short circuit; thus, the presence or absence of a short circuit was determined.

The battery was subjected to constant-current charging at a constant current of 1 C in an atmosphere at 23° C. until the battery voltage reached 4.2 V, and was then subjected to constant-voltage charging at a constant voltage of 4.2 V until the total time of charging reached 2.5 hours.

(Battery Evaluation: Measurement of the Battery Capacity)

For the battery in which a short circuit did not occur in the short-circuit test, the battery capacity was measured in the following manner. The battery after the charging mentioned above was subjected to constant-current discharging at a discharging current of 1 C until the battery voltage reached 3.0 V, and the discharging capacity at this time was measured and taken as the battery capacity. For the battery capacity, with the needed capacity required for the fabricated battery of 1000 mAh as a reference value, it was determined whether the needed battery capacity was satisfied or not. In Comparative Example 1-2 to Comparative Example 1-11, Comparative Example 1-14 to Comparative Example 1-16, and Comparative Example 1-18, the battery capacity was not able to be measured because a short circuit had occurred.

(Battery Evaluation: Battery Bending Test)

Figure 9:
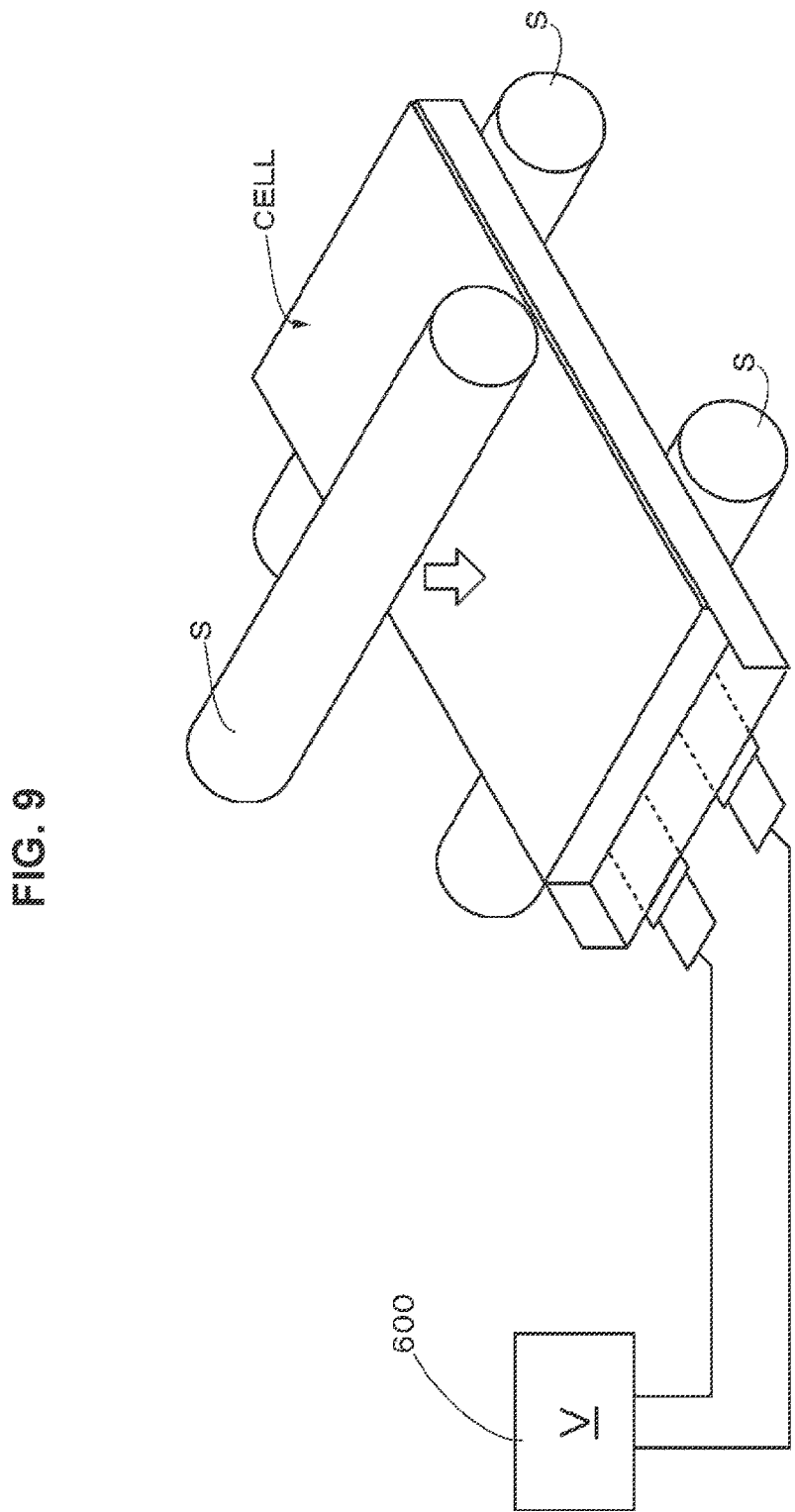
FIG. 9 is a schematic diagram for describing a battery bending test.
Figure 10:
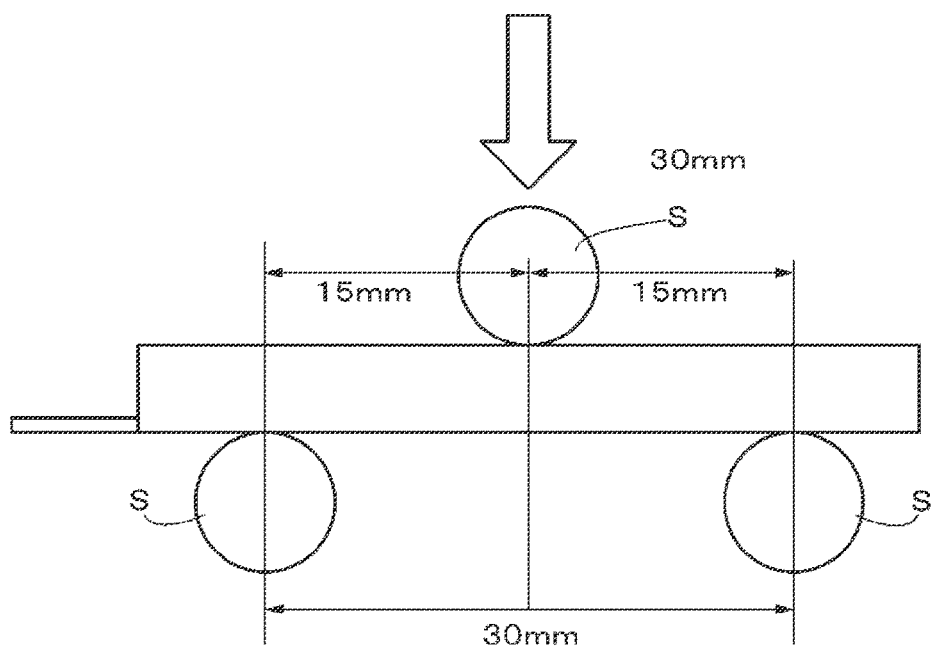
FIG. 10 is a schematic cross-sectional view for describing the battery bending test.

The battery in which a short circuit did not occur in the short-circuit test was discharged under the same conditions as those of the measurement of the battery capacity, and was then charged under similar conditions to those of the short-circuit test. Next, as shown in FIG. 9 and FIG. 10, the charged battery CELL was placed on two round bars S juxtaposed at a spacing of 30 mm, and one round bar S was pressed from above against the center position of the battery CELL and pressure was applied up to 300 N or until the pressed portion was bent 3 mm (reached a state of 3 mm downward). At this time, the voltage of the battery CELL was checked with a voltmeter (tester) 600, and when a voltage decrease of 1% or more was found, the battery was determined to have failed in the short-circuit assessment. The battery in which a short circuit occurred in the short-circuit test was classified as unmeasurable, and the battery of neither failed nor unmeasurable was classified as passed.

(Battery Evaluation: Measurement of the Maximum Value of the Amount of Winding Deviation)

For Example 1-1 to Example 1-57, from the image data obtained by photographing with a camera in the electrode body fabrication process, the measured value of the clearance between each two of the edges of the positive electrode, the negative electrode, and the separator was obtained. The value obtained by calculating the difference between the maximum value of the measured value of clearance and the set value of the mutual clearance (1 mm) ("the maximum value"–"1 mm") was taken as the maximum value of the amount of winding deviation.

The evaluation results are shown in Table 1.

TABLE 1

| | Electrode structure: wound type, laminated film battery | | | | | |
|---|---|---|---|---|---|---|
| | Gel electrolyte | | | | | |
| | Particle | | | | | |
| | Material type | Particle size D50 [nm] | Refractive index | Shape | Mass ratio Particles/resin | Mass ratio Particles/electrolyte salt |
| Example 1-1 | Boehmite | 1000 | 1.7 | Flat | 50/50 | 50/50 |
| Example 1-2 | Talc | 1000 | 1.6 | | | |
| Example 1-3 | Zinc oxide | 1000 | 2.0 | | | |
| Example 1-4 | Tin oxide | 1000 | 2.0 | | | |
| Example 1-5 | Silicon oxide | 1000 | 1.5 | | | |
| Example 1-6 | Magnesium oxide | 1000 | 1.7 | | | |
| Example 1-7 | Antimony oxide | 1000 | 2.1 | | | |
| Example 1-8 | Aluminum oxide | 1000 | 1.8 | Spherical | | |
| Example 1-9 | Magnesium sulfate | 1000 | 1.5 | | | |
| Example 1-10 | Calcium sulfate | 1000 | 1.6 | | | |
| Example 1-11 | Barium sulfate | 1000 | 1.6 | | | |
| Example 1-12 | Strontium sulfate | 1000 | 1.5 | | | |
| Example 1-13 | Magnesium carbonate | 1000 | 1.5 | *1 Spherical | | |
| Example 1-14 | Calcium carbonate | 1000 | 1.6 | | | |
| Example 1-15 | Barium carbonate | 1000 | 1.6 | | | |
| Example 1-16 | Lithium carbonate | 1000 | 1.5 | | | |
| Example 1-17 | Magnesium hydroxide | 1000 | 1.6 | Plate-like | | |
| Example 1-18 | Aluminum hydroxide | 1000 | 1.3 | | | |
| Example 1-19 | Zinc hydroxide | 1000 | 1.5 | | | |
| Example 1-20 | Boron carbide | 1000 | 1.5 | | | |
| Example 1-21 | Silicon nitride | 1000 | 2.0 | | | |
| Example 1-22 | Boron nitride | 1000 | 2.1 | | | |
| Example 1-23 | Aluminum nitride | 1000 | 2.1 | | | |
| Example 1-24 | Titanium nitride | 1000 | 1.3 | | | |
| Example 1-25 | Lithium fluoride | 1000 | 1.4 | Needle-like | | |
| Example 1-26 | Aluminum fluoride | 1000 | 1.3 | | | |
| Example 1-27 | Calcium fluoride | 1000 | 1.4 | | | |
| Example 1-28 | Barium fluoride | 1000 | 1.5 | | | |
| Example 1-29 | Magnesium fluoride | 1000 | 1.4 | | | |
| Example 1-30 | Trilithium phosphate | 1000 | 1.5 | | | |
| Example 1-31 | Magnesium phosphate | 1000 | 1.5 | | | |
| Example 1-32 | Magnesium hydrogen phosphate | 1000 | 1.5 | | | |
| Example 1-33 | Calcium silicate | 1000 | 1.6 | Scale-like | | |
| Example 1-34 | Zinc silicate | 1000 | 1.6 | | | |
| Example 1-35 | Zirconium silicate | 1000 | 2.0 | | | |

TABLE 1-continued

Electrode structure: wound type, laminated film battery

| | | | | | | |
|---|---|---|---|---|---|---|
| Example 1-36 | Aluminum silicate | 1000 | 1.7 | Scale-like | 50/50 | 50/50 |
| Example 1-37 | Magnesium silicate | 1000 | 1.6 | | | |
| Example 1-38 | Spinel | 1000 | 1.7 | | | |
| Example 1-39 | Hydrotalcite | 1000 | 1.5 | | | |
| Example 1-40 | Dolomite | 1000 | 1.6 | | | |
| Example 1-41 | Kaolinite | 1000 | 1.6 | | | |
| Example 1-42 | Sepiolite | 1000 | 1.5 | | | |
| Example 1-43 | Irnogolite | 1000 | 1.5 | | | |
| Example 1-44 | Sericite | 1000 | 1.6 | | | |
| Example 1-45 | Pyrophyllite | 1000 | 1.6 | | | |
| Example 1-46 | Mica | 1000 | 1.6 | | | |
| Example 1-47 | Zeolite | 1000 | 1.5 | | | |
| Example 1-48 | Mullite | 1000 | 1.5 | | | |
| Example 1-49 | Saponite | 1000 | 1.5 | | | |
| Example 1-50 | Attapulgite | 1000 | 1.5 | | | |
| Example 1-51 | Montmorillonite | 1000 | 1.5 | | | |
| Example 1-52 | Melamine | 1000 | 1.6 | Spherical | | |
| Example 1-53 | Ammonium polyphosphate | 1000 | 1.6 | | | |
| Example 1-54 | Melamine cyanurate | 1000 | 1.6 | | | |
| Example 1-55 | Melamine polyphosphate | 1000 | 1.6 | | | |
| Example 1-56 | Boehmite | 1000 | 1.7 | Flat | 95/5 | 50/50 |
| Example 1-57 | Boehmite | 1000 | 1.7 | | 50/50 | 95/5 |
| Comparative Example 1-1 | — | — | — | — | — | — |
| Comparative Example 1-2 | Zirconium oxide | 1000 | 2.4 | Spherical | 50/50 | 95/5 |
| Comparative Example 1-3 | Cerium oxide | 1000 | 2.2 | | | |
| Comparative Example 1-4 | Barium titanate | 1000 | 2.4 | | | |
| Comparative Example 1-5 | Strontium titanate | 1000 | 2.4 | | | |
| Comparative Example 1-6 | Titanium oxide | 1000 | 2.6 | | | |
| Comparative Example 1-7 | Diamond | 1000 | 2.4 | Polyhedral | | |
| Comparative Example 1-8 | Silicon carbide (colored particle) | 1000 | — | | | |
| Comparative Example 1-9 | Iron oxide (colored particle) | 1000 | — | | | |
| Comparative Example 1-10 | Silicon (colored particle) | 1000 | — | | | |
| Comparative Example 1-11 | Diamond | 1000 | 2.4 | Polyhedral | 95/5 | 50/50 |
| Comparative Example 1-12 | Diamond | 1000 | 2.4 | | 50/50 | 95/5 |
| Comparative Example 1-13 | Diamond | 1000 | 2.4 | | 10/90 | 10/95 |
| Comparative Example 1-14 | Boehmite | 1000 | 1.7 | Flat | 95/5 | 95/5 |
| Comparative Example 1-15 | Boehmite | 600 | 1.7 | | 50/50 | 50/50 |
| Comparative Example 1-16 | Boehmite | 30 | 1.7 | | 50/50 | 50/50 |
| Comparative Example 1-17 | Boehmite | 12000 | 1.7 | | 50/50 | 50/50 |
| Comparative Example 1-18 | Diamond | 600 | 2.4 | Polyhedral | 95/5 | 95/5 |

| | Gel electrolyte | | Evaluation | | | |
|---|---|---|---|---|---|---|
| | Matrix polymer | Application object | External appearance | Winding deviation short-circuit test | Battery capacity [mAh] | Battery bending test | Maximum value of amount of winding deviation [mm] |
| Example 1-1 | PVdF | Positive and negative electrode | Very transparent | Passed | 1050 | Passed | 0.2 |
| Example 1-2 | | | Very transparent | Passed | 1050 | Passed | 0.2 |
| Example 1-3 | | | Transparent | Passed | 1050 | Passed | 0.4 |
| Example 1-4 | | | Transparent | Passed | 1050 | Passed | 0.4 |
| Example 1-5 | | | Very transparent | Passed | 1050 | Passed | 0.2 |
| Example 1-6 | | | Very transparent | Passed | 1050 | Passed | 0.2 |
| Example 1-7 | | | Transparent | Passed | 1050 | Passed | 0.4 |
| Example 1-8 | | | Almost transparent | Passed | 1050 | Passed | 0.7 |
| Example 1-9 | | | Almost transparent | Passed | 1050 | Passed | 0.7 |
| Example 1-10 | | | Almost transparent | Passed | 1050 | Passed | 0.7 |
| Example 1-11 | | | Almost transparent | Passed | 1050 | Passed | 0.7 |
| Example 1-12 | | | Almost transparent | Passed | 1050 | Passed | 0.7 |
| Example 1-13 | | | Almost transparent | Passed | 1050 | Passed | 0.7 |
| Example 1-14 | | | Almost transparent | Passed | 1050 | Passed | 0.7 |
| Example 1-15 | | | Almost transparent | Passed | 1050 | Passed | 0.7 |
| Example 1-16 | | | Almost transparent | Passed | 1050 | Passed | 0.7 |
| Example 1-17 | | | Very transparent | Passed | 1050 | Passed | 0.2 |
| Example 1-18 | | | Very transparent | Passed | 1050 | Passed | 0.2 |
| Example 1-19 | | | Very transparent | Passed | 1050 | Passed | 0.2 |
| Example 1-20 | | | Very transparent | Passed | 1050 | Passed | 0.2 |
| Example 1-21 | | | Transparent | Passed | 1050 | Passed | 0.4 |
| Example 1-22 | | | Transparent | Passed | 1050 | Passed | 0.4 |
| Example 1-23 | | | Transparent | Passed | 1050 | Passed | 0.4 |
| Example 1-24 | | | Very transparent | Passed | 1050 | Passed | 0.2 |

TABLE 1-continued

Electrode structure: wound type, laminated film battery

| | | | | | | | |
|---|---|---|---|---|---|---|---|
| Example 1-25 | | | Transparent | Passed | 1050 | Passed | 0.4 |
| Example 1-26 | | | Transparent | Passed | 1050 | Passed | 0.4 |
| Example 1-27 | | | Transparent | Passed | 1050 | Passed | 0.4 |
| Example 1-28 | | | Transparent | Passed | 1050 | Passed | 0.4 |
| Example 1-29 | | | Transparent | Passed | 1050 | Passed | 0.4 |
| Example 1-30 | | | Transparent | Passed | 1050 | Passed | 0.4 |
| Example 1-31 | | | Transparent | Passed | 1050 | Passed | 0.4 |
| Example 1-32 | | | Transparent | Passed | 1050 | Passed | 0.4 |
| Example 1-33 | | | Very transparent | Passed | 1050 | Passed | 0.2 |
| Example 1-34 | | | Very transparent | Passed | 1050 | Passed | 0.2 |
| Example 1-35 | | | Very transparent | Passed | 1050 | Passed | 0.2 |
| Example 1-36 | PVdF | Positive | Very transparent | Passed | 1050 | Passed | 0.2 |
| Example 1-37 | | and | Very transparent | Passed | 1050 | Passed | 0.2 |
| Example 1-38 | | negative | Very transparent | Passed | 1050 | Passed | 0.2 |
| Example 1-39 | | electrodes | Very transparent | Passed | 1050 | Passed | 0.2 |
| Example 1-40 | | | Very transparent | Passed | 1050 | Passed | 0.2 |
| Example 1-41 | | | Very transparent | Passed | 1050 | Passed | 0.2 |
| Example 1-42 | | | Very transparent | Passed | 1050 | Passed | 0.2 |
| Example 1-43 | | | Very transparent | Passed | 1050 | Passed | 0.2 |
| Example 1-44 | | | Very transparent | Passed | 1050 | Passed | 0.2 |
| Example 1-45 | | | Very transparent | Passed | 1050 | Passed | 0.2 |
| Example 1-46 | | | Very transparent | Passed | 1050 | Passed | 0.2 |
| Example 1-47 | | | Very transparent | Passed | 1050 | Passed | 0.2 |
| Example 1-48 | | | Very transparent | Passed | 1050 | Passed | 0.2 |
| Example 1-49 | | | Very transparent | Passed | 1050 | Passed | 0.2 |
| Example 1-50 | | | Very transparent | Passed | 1050 | Passed | 0.2 |
| Example 1-51 | | | Very transparent | Passed | 1050 | Passed | 0.2 |
| Example 1-52 | | | Almost transparent | Passed | 1050 | Passed | 0.7 |
| Example 1-53 | | | Almost transparent | Passed | 1050 | Passed | 0.7 |
| Example 1-54 | | | Almost transparent | Passed | 1050 | Passed | 0.7 |
| Example 1-55 | | | Almost transparent | Passed | 1050 | Passed | 0.7 |
| Example 1-56 | | | Almost transparent | Passed | 1050 | Passed | 0.7 |
| Example 1-57 | | | Almost transparent | Passed | 1050 | Passed | 0.7 |
| Comparative Example 1-1 | PVdF | Positive | Transparent | Passed | 1050 | Failed | |
| Comparative Example 1-2 | | and | Opaque | Failed | Unmeasurable | Unmeasurable | |
| Comparative Example 1-3 | | negative | Opaque | Failed | Unmeasurable | Unmeasurable | |
| Comparative Example 1-4 | | electrodes | Opaque | Failed | Unmeasurable | Unmeasurable | |
| Comparative Example 1-5 | | | Opaque | Failed | Unmeasurable | Unmeasurable | |
| Comparative Example 1-6 | | | Opaque | Failed | Unmeasurable | Unmeasurable | |
| Comparative Example 1-7 | | | Opaque | Failed | Unmeasurable | Unmeasurable | |
| Comparative Example 1-8 | | | Opaque | Failed | Unmeasurable | Unmeasurable | |
| Comparative Example 1-9 | | | Opaque | Failed | Unmeasurable | Unmeasurable | |
| Comparative Example 1-10 | | | Opaque | Failed | Unmeasurable | Unmeasurable | |
| Comparative Example 1-11 | | | Opaque | Failed | Unmeasurable | Unmeasurable | |
| Comparative Example 1-12 | | *1 | Opaque | Passed | 990 | Passed | |
| Comparative Example 1-13 | | Positive | Near transparent | Passed | 1050 | Failed | |
| Comparative Example 1-14 | | and | Opaque | Failed | Unmeasurable | Unmeasurable | |
| Comparative Example 1-15 | | negative | Opaque | Failed | Unmeasurable | Unmeasurable | |
| Comparative Example 1-16 | | electrodes | Transparent | Unmeasurable | Unmeasurable | Unmeasurable | |
| Comparative Example 1-17 | | | Transparent | Passed | 890 | Passed | |
| Comparative Example 1-18 | | | Opaque | Failed | Unmeasurable | Unmeasurable | |

*1 Secondary particle with uneven surface (spherical)
*1: Positive and negative electrodes (with positive electrode width made 6% thinner)

As shown in Table 1, in Example 1-1 to Example 1-57, the gel electrolyte contained particles having a particle size and a refractive index in the prescribed ranges, and at least one of the mass ratio (particles/resin) and the mass ratio (particles/electrolyte salt) was set in the prescribed range. Thereby, the external appearance of the gel electrolyte was transparent, the battery capacity was not spoiled (not less than the needed capacity of 1000 mAh), the battery passed the winding deviation short-circuit test and the battery bending test, and safety was able to be ensured. On the other hand, in Comparative Example 1-1, since the gel electrolyte did not contain the particle, the strength was insufficient, and the battery failed the battery bending test. In Comparative Example 1-2 to Comparative Example 1-11, since the refractive index of the particle contained in the gel electrolyte was not in the prescribed range, the gel electrolyte was not transparent, and a short circuit was found in the winding deviation short-circuit test and the battery failed the test; consequently, both the battery capacity and the battery bending test were unmeasurable. In Comparative Example 1-12, since the positive electrode width was, like conventional ones, made 6% smaller than the positive electrode width of Example 1-57, the winding deviation was large, but the clearance between each two of the edges of the positive electrode, the negative electrode, and the separator was large as well, and consequently a short circuit did not occur. However, the battery capacity did not reach the needed capacity of 1000 mAh. In Comparative Example 1-13, although the transparency was improved by reducing the content ratio of the particles, the strength of the gel electrolyte was reduced and the battery failed the battery bending test, because the content ratio of the particles was small. In Comparative Example 1-14, since neither the mass ratio (particles/resin) nor the mass ratio (particles/electrolyte salt) was in the prescribed range, the gel electrolyte was not transparent, a short circuit was found in the winding deviation short-circuit test and the battery failed the test, and consequently both the battery capacity and the battery bending test were unmeasurable. In Comparative Example 1-15, since the particle size of the particle contained in the gel electrolyte was not in the prescribed range, the gel electrolyte was not transparent, a short circuit was found in the winding deviation short-circuit test and the battery failed the test, and consequently both the battery capacity and the battery bending test were unmeasurable. In Comparative Example 1-16, since the particle size of the particle contained in the gel electrolyte was too small, the viscosity of the gel electrolyte (coating solution) was too large, and the gel electrolyte was not able to be applied onto the electrode. In Comparative Example 1-17, since the particle size of the particle contained in the gel electrolyte was too large, the total distance between the electrodes was widened and the dead space was increased due to the size of the particle. Consequently, the battery capacity did not reach the needed capacity of 1000 mAh. In Comparative Example 1-18, since none of the refractive index of the particle, the particle size, the mass ratio (particles/resin), and the mass ratio (particles/electrolyte salt) was in the prescribed range, the gel electrolyte was not transparent, a short circuit was found in the winding deviation short-circuit test and the battery failed the test, and consequently both the battery capacity and the battery bending test were unmeasurable. The maximum value of the amount of winding deviation was found to be 0.2 mm in Examples in which the external appearance of the gel electrolyte was very transparent, 0.4 mm in Examples of transparent, 0.7 mm in Examples of almost transparent, and 0.9 mm in Examples of near transparent (Example 2-22, Example 2-23, etc. described later); and the value was smaller when the degree of transparency was higher. In the case where the maximum value of the amount of winding deviation is 0.5 mm or less as in Examples in which the external appearance of the gel electrolyte is very transparent and Examples in which it is transparent, since the accuracy of winding of the electrode and the separator is increased almost twice or more that of Examples of near transparent and Examples of almost transparent, there is an advantage that the clearance between each two of the edges of the positive electrode, the negative electrode, and the separator can be set narrower and the widths of the negative electrode and the positive electrode can thereby be set larger without changing the outer diameter dimension, and the battery capacity can be increased. Furthermore, in Examples in which the external appearance of the gel electrolyte is very transparent, since the accuracy of winding of the electrode and the separator is twice that of Examples of transparent, there is an advantage that the widths of the negative electrode and the positive electrode can be set still larger without changing the outer diameter dimension, and the battery capacity can be further increased. In Example 1-1 to Example 1-57 etc., since the electrode width is fixed, the advantage mentioned above is not reflected in the measured value of the battery capacity.

Example 2-1 to Example 2-8

A laminated film-type battery was fabricated in the same manner as Example 1-1 except that the amount of each of boehmite particles, the resin (PVdF), $LiPF_6$, and the nonaqueous solvent (solvent), which are the constituent components of the gel electrolyte, was changed as shown in Table 2 below. In Table 2, the amount of each of particles, PVdF, $LiPF_6$, and the solvent is shown in mass percentage relative to the total amount of the gel electrolyte (the total amount of the constituent components).

Example 2-9 to Example 2-16

A laminated film-type battery was fabricated in the same manner as Example 1-2 except that the amount of each of talc particles (flat particles (flake-like particles)), the resin (PVdF), $LiPF_6$, and the nonaqueous solvent (solvent), which are the constituent components of the gel electrolyte, was changed as shown in Table 2 below. In Table 2, the amount of each of particles, PVdF, $LiPF_6$, and the solvent is shown in mass percentage relative to the total amount of the gel electrolyte (the total amount of the constituent components).

Example 2-17 to Example 2-24

A laminated film-type battery was fabricated in the same manner as Example 1-8 except that the amount of each of aluminum oxide particles, the resin (PVdF), $LiPF_6$, and the nonaqueous solvent (solvent), which are the constituent components of the gel electrolyte, was changed as shown in Table 2 below. In Table 2, the amount of each of particles, PVdF, $LiPF_6$, and the solvent is shown in mass percentage relative to the total amount of the gel electrolyte (the total amount of the constituent components).

[Evaluation of the Battery: Winding Deviation Short-Circuit Test, Measurement of the Battery Capacity, Battery Bending Test, and Measurement of the Maximum Value of the Amount of Winding Deviation]

For the fabricated laminated film-type battery of each Example, a winding deviation short-circuit test, the measurement of the battery capacity, a battery bending test, and the measurement of the maximum value of the amount of winding deviation were performed in the same manner as Example 1-1.

The evaluation results are shown in Table 2.

TABLE 2

| | Electrode structure: wound type, laminated film battery | | | | | | | |
|---|---|---|---|---|---|---|---|---|
| | Gel electrolyte | | | | | | | |
| | Particle | | | | | | | |
| | Material type | Particle size D50 [nm] | Refractive index | Mass ratio Particles/resin | Mass ratio Particles/electrolyte salt | Particle [mass %] | Resin [mass %] | Electrolyte salt [mass %] |
| Example 2-1 | Boehmite | 75 | 1.7 | 15/85 | 15/85 | 5.2 | 29.3 | 29.3 |
| Example 2-2 | | | | 20/80 | 50/50 | 7.7 | 30.8 | 7.7 |
| Example 2-3 | | | | 30/70 | 50/50 | 8.8 | 20.6 | 8.8 |
| Example 2-4 | | | | 50/50 | 50/50 | 10.0 | 10.0 | 10.0 |

TABLE 2-continued

Electrode structure: wound type, laminated film battery

| | | | | | | | |
|---|---|---|---|---|---|---|---|
| Example 2-5 | | | | 70/30 | 70/30 | 20.6 | 8.8 | 8.8 |
| Example 2-6 | | | | 80/20 | 80/20 | 30.8 | 7.7 | 7.7 |
| Example 2-7 | | | | 85/15 | 85/15 | 36.7 | 6.8 | 6.8 |
| Example 2-8 | | | | 90/10 | 90/10 | 50.0 | 5.6 | 5.6 |
| Example 2-9 | Talc | 75 | 1.6 | 15/85 | 15/85 | 5.2 | 29.3 | 29.3 |
| Example 2-10 | | | | 50/50 | 20/80 | 7.7 | 7.7 | 30.8 |
| Example 2-11 | | | | 50/50 | 30/70 | 8.8 | 8.8 | 20.6 |
| Example 2-12 | | | | 50/50 | 50/50 | 10.0 | 10.0 | 10.0 |
| Example 2-13 | | | | 70/30 | 70/30 | 20.6 | 8.8 | 8.8 |
| Example 2-14 | | | | 80/20 | 80/20 | 30.8 | 7.7 | 7.7 |
| Example 2-15 | | | | 85/15 | 85/15 | 38.7 | 6.8 | 6.8 |
| Example 2-16 | | | | 90/10 | 90/10 | 50.0 | 5.6 | 5.6 |
| Example 2-17 | Aluminum | 75 | 1.6 | 15/85 | 15/85 | 5.2 | 29.3 | 29.3 |
| Example 2-18 | oxide | | | 50/50 | 20/80 | 7.7 | 7.7 | 30.8 |
| Example 2-19 | | | | 50/50 | 30/70 | 8.8 | 8.8 | 20.6 |
| Example 2-20 | | | | 50/50 | 50/50 | 10.0 | 10.0 | 10.0 |
| Example 2-21 | | | | 70/30 | 70/30 | 20.6 | 8.8 | 8.8 |
| Example 2-22 | | | | 80/20 | 80/20 | 30.8 | 7.7 | 7.7 |
| Example 2-23 | | | | 85/15 | 85/15 | 38.7 | 6.8 | 6.8 |
| Example 2-24 | | | | 90/10 | 90/10 | 50.0 | 5.6 | 5.6 |

| | Gel electrolyte | | | Evaluation | | | |
|---|---|---|---|---|---|---|---|
| | Solvent [mass %] | Application object | External appearance | Winding deviation short-circuit test | Battery capacity [mAh] | Battery bending test | Maximum value of amount of winding deviation [mm] |
| Example 2-1 | 36.2 | Positive and negative electrodes | Very transparent | Passed | 1050 | Passed | 0.2 |
| Example 2-2 | 53.8 | | Very transparent | Passed | 1050 | Passed | 0.2 |
| Example 2-3 | 61.8 | | Very transparent | Passed | 1050 | Passed | 0.2 |
| Example 2-4 | 70.0 | | Very transparent | Passed | 1050 | Passed | 0.2 |
| Example 2-5 | 61.8 | | Transparent | Passed | 1050 | Passed | 0.4 |
| Example 2-6 | 53.8 | | Transparent | Passed | 1050 | Passed | 0.4 |
| Example 2-7 | 47.7 | | Almost transparent | Passed | 1050 | Passed | 0.7 |
| Example 2-8 | 38.9 | | Near transparent | Passed | 1050 | Passed | 0.9 |
| Example 2-9 | 36.2 | Positive and negative electrodes | Very transparent | Passed | 1050 | Passed | 0.2 |
| Example 2-10 | 53.8 | | Very transparent | Passed | 1050 | Passed | 0.2 |
| Example 2-11 | 61.8 | | Very transparent | Passed | 1050 | Passed | 0.2 |
| Example 2-12 | 70.0 | | Very transparent | Passed | 1050 | Passed | 0.2 |
| Example 2-13 | 61.8 | | Transparent | Passed | 1050 | Passed | 0.4 |
| Example 2-14 | 53.8 | | Transparent | Passed | 1050 | Passed | 0.4 |
| Example 2-15 | 47.7 | | Almost transparent | Passed | 1050 | Passed | 0.7 |
| Example 2-16 | 33.9 | | Near transparent | Passed | 1050 | Passed | 0.9 |
| Example 2-17 | 36.2 | Positive and negative electrodes | Almost transparent | Passed | 1050 | Passed | 0.7 |
| Example 2-18 | 53.8 | | Almost transparent | Passed | 1050 | Passed | 0.7 |
| Example 2-19 | 61.8 | | Almost transparent | Passed | 1050 | Passed | 0.7 |
| Example 2-20 | 70.0 | | Almost transparent | Passed | 1050 | Passed | 0.7 |
| Example 2-21 | 61.8 | | Almost transparent | Passed | 1050 | Passed | 0.7 |
| Example 2-22 | 53.8 | | Almost transparent | Passed | 1050 | Passed | 0.7 |
| Example 2-23 | 47.7 | | Near transparent | Passed | 1050 | Passed | 0.9 |
| Example 2-24 | 38.9 | | Near transparent | Passed | 1050 | Passed | 0.9 |

As shown in Table 2, in Example 2-1 to Example 2-24, the gel electrolyte contained particles having a particle size and a refractive index in the prescribed ranges, and at least one of the mass ratio (particles/resin) and the mass ratio (particles/electrolyte salt) was set in the prescribed range. Thereby, the external appearance of the gel electrolyte was transparent, the battery capacity was not spoiled (not less than the needed capacity of 1000 mAh), the battery passed the winding deviation short-circuit test and the battery bending test, and safety was able to be ensured.

Example 3-1 to Example 3-13

In Example 3-1 to Example 3-13, a laminated film-type battery was fabricated in the same manner as Example 1-1 except that the particle size D50 of the boehmite particle, which is a constituent component of the gel electrolyte, was changed as shown in Table 3 below.

Example 3-14 to Example 3-26

In Example 3-14 to Example 3-26, a laminated film-type battery was fabricated in the same manner as Example 1-2 except that the particle size D50 of the talc particle, which is a constituent component of the gel electrolyte, was changed as shown in Table 3 below.

Example 3-27 to Example 3-39

In Example 3-27 to Example 3-39, a laminated film-type battery was fabricated in the same manner as Example 1-8 except that the particle size D50 of the aluminum oxide particle, which is a constituent component of the gel electrolyte, was changed as shown in Table 3 below.

[Evaluation of the Battery: Winding Deviation Short-Circuit Test, Measurement of the Battery Capacity, Battery Bending Test, and Measurement of the Maximum Value of the Amount of Winding Deviation]

For the fabricated laminated film-type battery of each Example, a winding deviation short-circuit test, the measurement of the battery capacity, a battery bending test, and the measurement of the maximum value of the amount of winding deviation were performed in the same manner as Example 1-1.

The evaluation results are shown in Table 3.

TABLE 3

Electrode structure: wound type, laminated film battery

| | Gel electrolyte | | | | | |
|---|---|---|---|---|---|---|
| | Particle | | | | | |
| | Material type | Particle size D50 [nm] | Refractive index | Mass ratio Particles/resin | Mass ratio Particles/electrolyte salt | Matrix polymer |
| Example 3-1 | Boehmite | 750 | 1.7 | 50/50 | 50/50 | PVdF |
| Example 3-2 | | 800 | | | | |
| Example 3-3 | | 2000 | | | | |
| Example 3-4 | | 3000 | | | | |
| Example 3-5 | | 5000 | | | | |
| Example 3-6 | | 7000 | | | | |
| Example 3-7 | | 10000 | | | | |
| Example 3-8 | | 450 | | | | |
| Example 3-9 | | 400 | | | | |
| Example 3-10 | | 300 | | | | |
| Example 3-11 | | 200 | | | | |
| Example 3-12 | | 100 | | | | |
| Example 3-13 | | 50 | | | | |
| Example 3-14 | Talc | 750 | 1.6 | 50/50 | 50/50 | PVdF |
| Example 3-15 | | 800 | | | | |
| Example 3-16 | | 2000 | | | | |
| Example 3-17 | | 3000 | | | | |
| Example 3-18 | | 5000 | | | | |
| Example 3-19 | | 7000 | | | | |
| Example 3-20 | | 10000 | | | | |
| Example 3-21 | | 450 | | | | |
| Example 3-22 | | 400 | | | | |
| Example 3-23 | | 300 | | | | |
| Example 3-24 | | 200 | | | | |
| Example 3-25 | | 100 | | | | |
| Example 3-26 | | 50 | | | | |
| Example 3-27 | Aluminum oxide | 750 | 1.7 | 50/50 | 50/50 | PVdF |
| Example 3-28 | | 800 | | | | |
| Example 3-29 | | 2000 | | | | |
| Example 3-30 | | 3000 | | | | |
| Example 3-31 | | 5000 | | | | |
| Example 3-32 | | 7000 | | | | |
| Example 3-33 | | 10000 | | | | |
| Example 3-34 | | 450 | | | | |
| Example 3-35 | | 400 | | | | |
| Example 3-36 | | 300 | | | | |
| Example 3-37 | | 200 | | | | |
| Example 3-38 | | 100 | | | | |
| Example 3-39 | | 50 | | | | |

| | Gel electrolyte | | Evaluation | | | |
|---|---|---|---|---|---|---|
| | Application object | External appearance | Winding deviation short-circuit test | Battery capacity [mAh] | Battery bending test | Maximum value of amount of winding deviation [mm] |
| Example 3-1 | Positive and negative electrodes | Almost transparent | Passed | 1050 | Passed | 0.7 |
| Example 3-2 | | Transparent | Passed | 1050 | Passed | 0.4 |
| Example 3-3 | | Very transparent | Passed | 1050 | Passed | 0.2 |
| Example 3-4 | | Very transparent | Passed | 1050 | Passed | 0.2 |
| Example 3-5 | | Very transparent | Passed | 1050 | Passed | 0.2 |
| Example 3-6 | | Very transparent | Passed | 1040 | Passed | 0.2 |
| Example 3-7 | | Very transparent | Passed | 1020 | Passed | 0.2 |
| Example 3-8 | | Almost transparent | Passed | 1050 | Passed | 0.7 |
| Example 3-9 | | Transparent | Passed | 1050 | Passed | 0.4 |
| Example 3-10 | | Very transparent | Passed | 1050 | Passed | 0.2 |
| Example 3-11 | | Very transparent | Passed | 1050 | Passed | 0.2 |

TABLE 3-continued

| | Electrode structure: wound type, laminated film battery | | | | | |
|---|---|---|---|---|---|---|
| Example 3-12 | | Very transparent | Passed | 1050 | Passed | 0.2 |
| Example 3-13 | | Transparent | Passed | 1050 | Passed | 0.4 |
| Example 3-14 | Positive and | Almost transparent | Passed | 1050 | Passed | 0.7 |
| Example 3-15 | negative | Transparent | Passed | 1050 | Passed | 0.4 |
| Example 3-16 | electrodes | Very transparent | Passed | 1050 | Passed | 0.2 |
| Example 3-17 | | Very transparent | Passed | 1050 | Passed | 0.2 |
| Example 3-18 | | Very transparent | Passed | 1050 | Passed | 0.2 |
| Example 3-19 | | Very transparent | Passed | 1040 | Passed | 0.2 |
| Example 3-20 | | Very transparent | Passed | 1020 | Passed | 0.2 |
| Example 3-21 | | Almost transparent | Passed | 1050 | Passed | 0.7 |
| Example 3-22 | | Transparent | Passed | 1050 | Passed | 0.4 |
| Example 3-23 | | Very transparent | Passed | 1050 | Passed | 0.2 |
| Example 3-24 | | Very transparent | Passed | 1050 | Passed | 0.2 |
| Example 3-25 | | Very transparent | Passed | 1050 | Passed | 0.2 |
| Example 3-26 | | Transparent | Passed | 1050 | Passed | 0.4 |
| Example 3-27 | Positive and | Near transparent | Passed | 1050 | Passed | 0.9 |
| Example 3-28 | negative | Almost transparent | Passed | 1050 | Passed | 0.7 |
| Example 3-29 | electrodes | Almost transparent | Passed | 1050 | Passed | 0.7 |
| Example 3-30 | | Almost transparent | Passed | 1050 | Passed | 0.7 |
| Example 3-31 | | Almost transparent | Passed | 1050 | Passed | 0.7 |
| Example 3-32 | | Almost transparent | Passed | 1040 | Passed | 0.7 |
| Example 3-33 | | Almost transparent | Passed | 1020 | Passed | 0.7 |
| Example 3-34 | | Near transparent | Passed | 1050 | Passed | 0.9 |
| Example 3-35 | | Almost transparent | Passed | 1050 | Passed | 0.7 |
| Example 3-36 | | Almost transparent | Passed | 1050 | Passed | 0.7 |
| Example 3-37 | | Almost transparent | Passed | 1050 | Passed | 0.7 |
| Example 3-38 | | Almost transparent | Passed | 1050 | Passed | 0.7 |
| Example 3-39 | | Almost transparent | Passed | 1050 | Passed | 0.7 |

As shown in Table 3, in Example 3-1 to Example 3-39, the gel electrolyte contained particles having a particle size and a refractive index in the prescribed ranges, and at least one of the mass ratio (particles/resin) and the mass ratio (particles/electrolyte salt) was set in the prescribed range. Thereby, the external appearance of the gel electrolyte was transparent, the battery capacity was not spoiled (not less than the needed capacity of 1000 mAh), the battery passed the winding deviation short-circuit test and the battery bending test, and safety was able to be ensured. Furthermore, it has been verified that the degree of transparency can be changed by changing the particle size of the particle.

Example 4-1 to Example 4-8

In Example 4-1 to Example 4-8, a laminated film-type battery was fabricated in the same manner as Example 1-1 except that the particle size D40, the particle size D50, and the particle size D60 of the boehmite particle, which is a constituent component of the gel electrolyte, were changed as shown in Table 4 below.

[Evaluation of the Battery: Winding Deviation Short-Circuit Test, Measurement of the Battery Capacity, Battery Bending Test, and Measurement of the Maximum Value of the Amount of Winding Deviation]

For the fabricated laminated film-type battery of each Example, a winding deviation short-circuit test, the measurement of the battery capacity, a battery bending test, and the measurement of the maximum value of the amount of winding deviation were performed in the same manner as Example 1-1.

The evaluation results are shown in Table 4.

TABLE 4

| | Electrode structure: wound type, laminated film battery | | | | | | | | Evaluation | | | |
|---|---|---|---|---|---|---|---|---|---|---|---|---|
| | Gel electrolyte | | | | | | | | | | | Maximum |
| | Particle | | | | | | | | Winding | | | value of |
| | | Particle size D40 [nm] | Particle size D50 [nm] | Particle size D60 [nm] | Mass ratio Particles/ electrolyte salt | Matrix polymer | Application object | External appearance | deviation short-circuit test | Battery capacity [mAh] | Battery bending test | amount of winding deviation [mm] |
| | Material type | | | | | | | | | | | |
| Example 4-1 | Boehmite | 700 | 750 | 800 | 50/50 | PVdF | Positive | Almost transparent | Passed | 1053 | Passed | 0.7 |
| Example 4-2 | | 750 | 800 | 850 | | | and | Transparent | Passed | 1052 | Passed | 0.4 |
| Example 4-3 | | 9000 | 10000 | 11000 | | | negative | Very transparent | Passed | 1051 | Passed | 0.2 |
| Example 4-4 | | 8200 | 9000 | 10000 | | | electrodes | Very transparent | Passed | 1050 | Passed | 0.2 |

TABLE 4-continued

Electrode structure: wound type, laminated film battery

| | Gel electrolyte | | | | | | | Evaluation | | | |
|---|---|---|---|---|---|---|---|---|---|---|---|
| | Particle | | | | | | | Winding | | | Maximum value of |
| | Material type | Particle size D40 [nm] | Particle size D50 [nm] | Particle size D60 [nm] | Mass ratio Particles/ electrolyte salt | Matrix polymer | Application object | External appearance | deviation short-circuit test | Battery capacity [mAh] | Battery bending test | amount of winding deviation [mm] |
| Example 4-5 | | 400 | 450 | 500 | | | | Almost transparent | Passed | 1054 | Passed | 0.7 |
| Example 4-6 | | 350 | 400 | 450 | | | | Transparent | Passed | 1055 | Passed | 0.4 |
| Example 4-7 | | 40 | 50 | 60 | | | | Almost transparent | Passed | 1056 | Passed | 0.7 |
| Example 4-8 | | 50 | 60 | 70 | | | | Transparent | Passed | 1057 | Passed | 0.4 |

As shown in Table 4, in Example 4-1 to Example 4-8, the gel electrolyte contained particles having a particle size and a refractive index in the prescribed ranges, and at least one of the mass ratio (particles/resin) and the mass ratio (particles/electrolyte salt) was set in the prescribed range. Thereby, the external appearance of the gel electrolyte was transparent, the battery capacity was not spoiled (not less than the needed capacity of 1000 mAh), the battery passed the winding deviation short-circuit test and the battery bending test, and safety was able to be ensured.

Example 5-1 to Example 5-3

In Example 5-1 to Example 5-3, a laminated film-type battery was fabricated in the same manner as Example 1-2 except that plate-like talc particles shown in Table 5 below were used as the filler.

Example 5-4 to Example 5-6

In Example 5-4 to Example 5-6, a laminated film-type battery was fabricated in the same manner as Example 1-8 except that needle-like aluminum oxide particles shown in Table 5 below were used as the filler.

[Evaluation of the Battery: Winding Deviation Short-Circuit Test, Measurement of the Battery Capacity, Battery Bending Test, and Measurement of the Maximum Value of the Amount of Winding Deviation]

For the fabricated laminated film-type battery of each Example, a winding deviation short-circuit test, the measurement of the battery capacity, a battery bending test, and the measurement of the maximum value of the amount of winding deviation were performed in the same manner as Example 1-1.

The evaluation results are shown in Table 5.

TABLE 5

Electrode structure: wound type, laminated film battery

| | Gel electrolyte | | | | | | | | Evaluation | | | |
|---|---|---|---|---|---|---|---|---|---|---|---|---|
| | Particle | | | | | | | | Winding | | | Maximum value of |
| | Material type | Particle size D50 [nm] | Plate thickness [nm] | Diameter of needle [nm] | Mass ratio Particles/ electrolyte salt | Matrix polymer | Application object | External appearance | deviation short-circuit test | Battery capacity [mAh] | Battery bending test | amount of winding deviation [mm] |
| Example 5-1 | Talc (plate like particle) | 450 | 50 | — | 50/50 | PVdF | Positive and negative electrodes | Almost transparent | Passed | 1050 | Passed | 0.7 |
| Example 5-2 | | 750 | 100 | — | 50/50 | | | Almost transparent | Passed | 1050 | Passed | 0.7 |
| Example 5-3 | | 10000 | 450 | — | 50/50 | | | Almost transparent | Passed | 1050 | Passed | 0.7 |
| Example 5-4 | Aluminum oxide (needle-like particle) | 450 | — | 50 | 50/50 | | | Almost transparent | Passed | 1050 | Passed | 0.7 |
| Example 5-5 | | 750 | — | 100 | 50/50 | | | Almost transparent | Passed | 1050 | Passed | 0.7 |
| Example 5-6 | | 10000 | — | 450 | 50/50 | | | Almost transparent | Passed | 1050 | Passed | 0.7 |

As shown in Table 5, in Example 5-1 to Example 5-6, the gel electrolyte contained particles having a particle size and a refractive index in the prescribed ranges, and at least one of the mass ratio (particles/resin) and the mass ratio (particles/electrolyte salt) was set in the prescribed range. Thereby, the external appearance of the gel electrolyte was transparent, the battery capacity was not spoiled (not less than the needed capacity of 1000 mAh), the battery passed the winding deviation short-circuit test and the battery bending test, and safety was able to be ensured.

Example 6-1 to Example 6-29

In Example 6-1 to Example 6-29, a laminated film-type battery was fabricated in the same manner as Example 1-1 except that the type of the matrix polymer compound (resin) contained in the gel electrolyte layer was changed as shown in Table 6 below.

[Evaluation of the Battery: Winding Deviation Short-Circuit Test, Measurement of the Battery Capacity, Battery Bending Test, and Measurement of the Maximum Value of the Amount of Winding Deviation]

For the fabricated laminated film-type battery of each Example, a winding deviation short-circuit test, the measurement of the battery capacity, a battery bending test, and the measurement of the maximum value of the amount of winding deviation were performed in the same manner as Example 1-1.

The evaluation results are shown in Table 6.

TABLE 6

Electrode structure: wound type, laminated film battery

| | Gel electrolyte | | | | | |
|---|---|---|---|---|---|---|
| | Particle | | | | | |
| | Material type | Particle size D50 [nm] | Refractive index | Mass ratio Particles/resin | Mass ratio Particles/electrolyte salt | Matrix polymer |
| Example 6-1 | Boehmite | 1000 | 1.7 | 50/50 | 50/50 | Polyvinylidene difluoride |
| Example 6-2 | | | | | | Polytetrafluoroethylene |
| Example 6-3 | | | | | | Vinylidene fluoride-tetrafluoroethylene copolymer |
| Example 6-4 | | | | | | Vinylidene fluoride-tetrafluoropropylene copolymer |
| Example 6-5 | | | | | | Ethylene-tetrafluoroethylene copolymer |
| Example 6-6 | | | | | | Styrene-butadiene copolymer |
| Example 6-7 | | | | | | Acrylonitrile-butadiene copolymer |
| Example 6-8 | | | | | | Acrylonitrile-butadiene-styrene copolymer |
| Example 6-9 | | | | | | Methacrylic acid ester-acrylic acid ester copolymer |
| Example 6-10 | | | | | | Styrene-acrylic acid ester copolymer |
| Example 6-11 | | | | | | Acrylonitrile-acrylic acid ester copolymer |
| Example 6-12 | | | | | | Ethylene-propylene rubber, polyvinyl alcohol |
| Example 6-13 | | | | | | Polyvinyl acetate |
| Example 6-14 | | | | | | Ethyl cellulose |
| Example 6-15 | | | | | | Cellulose derivative |
| Example 6-16 | | | | | | Polyphenylene ether |
| Example 6-17 | | | | | | Polysulfone |
| Example 6-18 | | | | | | Polyethersulfone |
| Example 6-19 | | | | | | Polyphenylene sulfide |
| Example 6-20 | | | | | | Polyetherimide |
| Example 6-21 | | | | | | Polyimide |
| Example 6-22 | | | | | | Polyamide |
| Example 6-23 | | | | | | Polyamide-imide |
| Example 6-24 | | | | | | Polyacrylonitrile |
| Example 6-25 | | | | | | Polyvinyl alcohol |
| Example 6-26 | | | | | | Polyether |
| Example 6-27 | | | | | | Acrylic acid resin |
| Example 6-28 | | | | | | Polyester |
| Example 6-29 | | | | | | Polyethylene glycol |

TABLE 6-continued

Electrode structure: wound type, laminated film battery

| | Gel electrolyte | | Evaluation | | | |
|---|---|---|---|---|---|---|
| | Application object | External appearance | Winding deviation short-circuit test | Battery capacity [mAh] | Battery bending test | Maximum value of amount of winding deviation [mm] |
| Example 6-1 | Positive and negative negative | Very transparent | Passed | 1050 | Passed | 0.2 |
| Example 6-2 | | Very transparent | Passed | 1050 | Passed | 0.2 |
| Example 6-3 | | Very transparent | Passed | 1050 | Passed | 0.2 |
| Example 6-4 | | Very transparent | Passed | 1050 | Passed | 0.2 |
| Example 6-5 | | Very transparent | Passed | 1050 | Passed | 0.2 |
| Example 6-6 | | Very transparent | Passed | 1050 | Passed | 0.2 |
| Example 6-7 | | Very transparent | Passed | 1050 | Passed | 0.2 |
| Example 6-8 | | Very transparent | Passed | 1050 | Passed | 0.2 |
| Example 6-9 | | Very transparent | Passed | 1050 | Passed | 0.2 |
| Example 6-10 | | Very transparent | Passed | 1050 | Passed | 0.2 |
| Example 6-11 | | Very transparent | Passed | 1050 | Passed | 0.2 |
| Example 6-12 | | Very transparent | Passed | 1050 | Passed | 0.2 |
| Example 6-13 | | Transparent | Passed | 1050 | Passed | 0.4 |
| Example 6-14 | | Transparent | Passed | 1050 | Passed | 0.4 |
| Example 6-15 | | Transparent | Passed | 1050 | Passed | 0.4 |
| Example 6-16 | | Transparent | Passed | 1050 | Passed | 0.4 |
| Example 6-17 | | Transparent | Passed | 1050 | Passed | 0.4 |
| Example 6-18 | | Transparent | Passed | 1050 | Passed | 0.4 |
| Example 6-19 | | Transparent | Passed | 1050 | Passed | 0.4 |
| Example 6-20 | | Transparent | Passed | 1050 | Passed | 0.4 |
| Example 6-21 | | Transparent | Passed | 1050 | Passed | 0.4 |
| Example 6-22 | | Transparent | Passed | 1050 | Passed | 0.4 |
| Example 6-23 | | Transparent | Passed | 1050 | Passed | 0.4 |
| Example 6-24 | | Transparent | Passed | 1050 | Passed | 0.4 |
| Example 6-25 | | Transparent | Passed | 1050 | Passed | 0.4 |
| Example 6-26 | | Transparent | Passed | 1050 | Passed | 0.4 |
| Example 6-27 | | Transparent | Passed | 1050 | Passed | 0.4 |
| Example 6-28 | | Transparent | Passed | 1050 | Passed | 0.4 |
| Example 6-29 | | Transparent | Passed | 1050 | Passed | 0.4 |

As shown in Table 6, in Example 6-1 to Example 6-29, the gel electrolyte contained particles having a particle size and a refractive index in the prescribed ranges, and at least one of the mass ratio (particles/resin) and the mass ratio (particles/electrolyte salt) was set in the prescribed range. Thereby, the external appearance of the gel electrolyte was transparent, the battery capacity was not spoiled (not less than the needed capacity of 1000 mAh), the battery passed the winding deviation short-circuit test and the battery bending test, and safety was able to be ensured.

Example 7-1 to Example 7-6

In Example 7-1 to Example 7-6, a laminated film-type battery was fabricated in the same manner as Example 1-2 except that flat (flake-like) talc particles similar to those of Example 1-2 were used and the thickness of the gel electrolyte layer was changed.

[Evaluation of the Battery: Winding Deviation Short-Circuit Test, Measurement of the Battery Capacity, Battery Bending Test, and Measurement of the Maximum Value of the Amount of Winding Deviation]

For the fabricated laminated film-type battery of each Example, a winding deviation short-circuit test, the measurement of the battery capacity, a battery bending test, and the measurement of the maximum value of the amount of winding deviation were performed in the same manner as Example 1-1.

The evaluation results are shown in Table 7.

TABLE 7

Electrode structure: wound type, laminated film battery

| | Gel electrolyte | | | | | | | | Evaluation | | | |
|---|---|---|---|---|---|---|---|---|---|---|---|---|
| | Particle | | | | | | | | | | | Maximum value of amount of winding deviation [mm] |
| | Material type | Particle size D50 [nm] | Refractive index | Mass ratio Particles/ resin | Mass ratio Particles/ electrolyte salt | Thickness [μm] | Application object | External appearance | Winding deviation short-circuit test | Battery capacity [mAh] | Battery bending test | |
| Example 7-1 | Talc | 1000 | 1.6 | 50/50 | 50/50 | 15 | Positive and | Almost transparent | Passed | 1050 | Passed | 0.7 |

TABLE 7-continued

Electrode structure: wound type, laminated film battery

| | Gel electrolyte | | | | | | | Evaluation | | | Maximum value of amount of winding deviation [mm] |
|---|---|---|---|---|---|---|---|---|---|---|---|
| | Particle | | | | | | | | | | |
| | Material type | Particle size D50 [nm] | Refractive index | Mass ratio Particles/ resin | Mass ratio Particles/ electrolyte salt | Thickness [μm] | Application object | External appearance | Winding deviation short-circuit test | Battery capacity [mAh] | Battery bending test | |
| Example 7-2 | | | | | | 10 | negative electrodes | Transparent | Passed | 1050 | Passed | 0.4 |
| Example 7-3 | | | | | | 8 | | Transparent | Passed | 1050 | Passed | 0.4 |
| Example 7-4 | | | | | | 5 | | Very transparent | Passed | 1050 | Passed | 0.2 |
| Example 7-5 | | | | | | 2 | | Very transparent | Passed | 1050 | Passed | 0.2 |
| Example 7-6 | | | | | | 1 | | Very transparent | Passed | 1051 | Passed | 0.2 |

As shown in Table 7, in Example 7-1 to Example 7-6, the gel electrolyte contained particles having a particle size and a refractive index in the prescribed ranges, and at least one of the mass ratio (particles/resin) and the mass ratio (particles/electrolyte salt) was set in the prescribed range. Thereby, the external appearance of the gel electrolyte was transparent, the battery capacity was not spoiled (not less than the needed capacity of 1000 mAh), the battery passed the winding deviation short-circuit test and the battery bending test, and safety was able to be ensured. Furthermore, it has been verified that the degree of transparency can be changed by changing the thickness of the gel electrolyte.

Example 8-1

In Example 8-1, a laminated film type-battery was fabricated in the same manner as Example 1-1.

Example 8-2

Instead of forming a gel electrolyte layer on both surfaces of each of the positive electrode and the negative electrode, a gel electrolyte was formed on both surfaces of the separator. That is, a laminated film-type battery was fabricated in the same manner as Example 8-1 except that the formation of the gel electrolyte layer was changed as below.
[Formation of a Gel Electrolyte Layer]
Lithium hexafluorophosphate (LiPF$_6$) as an electrolyte salt was dissolved at a concentration of 1 mol/dm$^3$ in a nonaqueous solvent in which ethylene carbonate (EC), propylene carbonate (PC), and vinylene carbonate (VC) were mixed at a mass ratio of 49:49:2; thereby, a nonaqueous electrolyte solution was prepared.

Subsequently, using polyvinylidene difluoride (PVdF) as the matrix polymer compound (resin) that retains the nonaqueous electrolyte solution, the nonaqueous electrolyte solution, polyvinylidene difluoride, dimethyl carbonate (DMC) as a diluting solvent, and boehmite particles (particle size D50: 1000 nm; refractive index: 1.7; plate-like particles) as a filler were mixed together to prepare a sol-like precursor solution.

The precursor solution is a solution containing the diluting solvent (DMC) equal in mass to the nonaqueous solvent, in addition to the constituent components of the gel electrolyte layer (boehmite particles: 10 mass %; the matrix polymer compound (PVdF): 10 mass %; LiPF$_6$: 10 mass %; the nonaqueous solvent: 70 mass %). The mass ratio between the boehmite particles and the electrolyte salt (LiPF$_6$) (particles/electrolyte salt) is 50/50, and the mass ratio between the boehmite particles and the resin (PVdF) (particles/resin) is 50/50.

Subsequently, the precursor solution was applied to both surfaces of a separator, and drying was performed to remove the diluting solvent (DMC). Thus, a gel electrolyte layer was formed on the surface of the separator.
[Assembly of a Laminated Film-Type Battery]
A positive electrode, a negative electrode, and the separator, on both surfaces of which the gel electrolyte layer was formed, were stacked in the order of the positive electrode, the separator, the negative electrode, and the separator, and then a winding apparatus similar to that of Example 8-1 was used to perform winding multiple times in the longitudinal direction, in a flat shape. After that, the winding end portion was fixed by an adhesive tape; thus, a wound electrode body was formed.

Next, the wound electrode body was packaged with a laminated film including a soft aluminum layer, and the led-out side of the positive electrode terminal and the negative electrode terminal around the wound electrode body and the other two sides were sealed up and closed tight by thermal fusion bonding under reduced pressure. Thus, the laminated film-type battery shown in FIG. 1 with a battery shape of 4.5 mm in thickness, 30 mm in width, and 50 mm in height was fabricated.

Example 8-3

In Example 8-3, a laminated film-type battery in which the configuration of each of the positive electrode, the negative electrode, the separator, and the gel electrolyte layer and the application object of the gel electrolyte were similar to those of Example 8-1 and a stacked electrode body was packaged with a laminated film was fabricated.
[Assembly of a Laminated Film-Type Battery]
A precursor solution similar to that of Example 8-1 was applied to both surfaces of a rectangular positive electrode and a rectangular negative electrode, and drying was performed to remove the diluting solvent; thereby, a gel electrolyte layer was formed on the surfaces of the positive electrode and the negative electrode. Next, the rectangular positive electrode (on both surfaces of which the gel electrolyte layer was formed), the rectangular negative electrode (on both surfaces of which the gel electrolyte layer was formed), and a rectangular separator were stacked in the order of the positive electrode, the separator, the negative electrode, and the separator; thus, a stacked electrode body was formed.

The stacking of the positive electrode, the separator, and the negative electrode was performed using a sheet stacking apparatus that processes an image photographed with a camera to detect the positions of the edges of the four sides of the rectangular members, performs alignment in the horizontal direction so that the spacing between each two of the edges of the four sides of the members is an appropriate clearance, and then performs stacking operation. In the stacking apparatus, the detection of the position of the edge was performed only on two adjacent sides serving as a reference. When a stacking deviation occurs due to false detection, the edges of the positive and negative electrodes on the opposite side to the two adjacent sides serving as a reference may protrude from the separator, and a short circuit may occur.

Next, the stacked electrode body was packaged with a laminated film including a soft aluminum layer, and the led-out side of the positive electrode terminal and the negative electrode terminal around the stacked electrode body and the other three sides were sealed up and closed tight by thermal fusion bonding. Thus, the laminated film-type battery shown in FIGS. 3A to 3C with a battery shape of 4.5 mm in thickness, 30 mm in width, and 50 mm in height was fabricated.

Example 8-4

In Example 8-4, instead of forming a gel electrolyte layer on both surfaces of each of the positive electrode and the negative electrode, a gel electrolyte was formed on both surfaces of the separator.

Example 8-5

In Example 8-5, a laminated film-type battery similar to that of Example 8-1 was used. The simplified battery pack (soft pack) shown in FIG. 4, FIG. 5A, and FIG. 5B was fabricated.

[Evaluation of the Battery: Winding Deviation or Stacking Deviation Short-Circuit Test, Measurement of the Battery Capacity, Battery Bending Test, and Measurement of the Maximum Value of the Amount of Winding Deviation or the Amount of Stacking Deviation]

For the fabricated laminated film-type battery of each Example, a winding deviation or stacking deviation short-circuit test, the measurement of the battery capacity, a battery bending test, and the measurement of the maximum value of the amount of winding deviation or the amount of stacking deviation were performed in the same manner as Example 1-1.

The evaluation results are shown in Table 8.

TABLE 8

| | | Gel electrolyte | | | | | |
|---|---|---|---|---|---|---|---|
| | | Particle | | | | | |
| | Battery form | Material type | Particle size D50 [nm] | Refractive index | Mass ratio Particles/resin | Mass ratio Particles/electrolyte salt | Matrix polymer |
| Example 8-1 | Wound-type laminated film battery | Boehmite | 1000 | 1.7 | 50/50 | 50/50 | PVdF |
| Example 8-2 | Wound-type laminated film battery | Boehmite | 1000 | 1.7 | 50/50 | 50/50 | PVdF |
| Example 8-3 | Stacked-type laminated film battery | Boehmite | 1000 | 1.7 | 50/50 | 50/50 | PVdF |
| Example 8-4 | Stacked-type laminated film battery | Boehmite | 1000 | 1.7 | 50/50 | 50/50 | PVdF |
| Example 8-5 | Laminated film battery of simplified battery pack | Boehmite | 1000 | 1.7 | 50/50 | 50/50 | PVdF |

| | Gel electrolyte | | Evaluation | | | |
|---|---|---|---|---|---|---|
| | Application object | External appearance | Winding deviation or stacking deviation short-circuit test | Battery capacity [mAh] | Battery bending test | Maximum value of amount of winding deviation or amount of stacking deviation [mm] |
| Example 8-1 | Positive and negative electrodes | Very transparent | Passed | 1050 | Passed | 0.2 |
| Example 8-2 | Separator | Very transparent | Passed | 1050 | Passed | 0.2 |
| Example 8-3 | Positive and negative electrodes | Very transparent | Passed | 1050 | Passed | 0.2 |
| Example 8-4 | Separator | Very transparent | Passed | 1050 | Passed | 0.2 |
| Example 8-5 | Positive and negative electrodes | Very transparent | Passed | 1050 | Passed | 0.2 |

As shown in Table 8, in Example 8-1 to Example 8-5, the gel electrolyte contained particles having a particle size and a refractive index in the prescribed ranges, and at least one of the mass ratio (particles/resin) and the mass ratio (particles/electrolyte salt) was set in the prescribed range. Thereby, the external appearance of the gel electrolyte was transparent, the battery capacity was not spoiled (not less than the needed capacity of 1000 mAh), the battery passed the winding deviation short-circuit test and the battery bending test, and safety was able to be ensured.

5. Other Embodiments

Embodiments of the present technology are not limited to the above-described embodiments of the present technology, but may be modified and applied in various ways within the scope of the present technology without departing from the gist of the present technology.

For example, the numerical values, the configurations, the shapes, the materials, the ingredients, the manufacturing processes, and the like exemplified in the above-described embodiments are merely examples. Numerical values, configurations, shapes, materials, ingredients, manufacturing processes, and the like different therefrom may be used, as necessary.

The configurations, the methods, the processes, the shapes, the materials, the numerical values, and the like in the above-described embodiments may be combined without departing from the gist of the present technology.

The electrolyte layer of the present technology can be similarly used also in the case of having other battery structures such as a circular cylindrical shape, coin-like shape, square shape, or button-like shape.

Additionally, the present technology may also be configured as below.

[1]
A battery including:
a positive electrode;
a negative electrode;
a separator; and
an electrolyte containing particles, an electrolyte solution containing a solvent and an electrolyte salt, and a matrix polymer compound,
wherein a particle size D50 of the particle is not less than 50 nm and not more than 450 nm, or not less than 750 nm and not more than 10,000 nm,
a refractive index of the particle is not less than 1.3 and less than 2.4, and
one of a mass ratio between the particles and the matrix polymer compound (particles/matrix polymer compound) and a mass ratio between the particles and the electrolyte salt (particles/electrolyte salt) is not less than 15/85 and not more than 90/10.

[2]
The battery according to [1], wherein
the electrolyte in a gel form in which the matrix polymer compound is impregnated with the electrolyte solution and the matrix polymer compound is swollen is formed on both surfaces of at least one of the positive electrode and the negative electrode or on at least one of both surfaces of the separator.

[3]
The battery according to any of [1] and [2], wherein
both of the mass ratio (particles/matrix polymer compound) and the mass ratio (particles/electrolyte salt) are not less than 15/85 and not more than 90/10.

[4]
The battery according to any of [1] to [3], wherein the electrolyte is transparent.

[5]
The battery according to any of [1] to [4], wherein
the particles are at least one of inorganic particles and organic particles.

[6]
The battery according to [5], wherein
the inorganic particles are particles of at least one selected from the group consisting of silicon oxide, zinc oxide, tin oxide, magnesium oxide, antimony oxide, aluminum oxide, magnesium sulfate, calcium sulfate, barium sulfate, strontium sulfate, magnesium carbonate, calcium carbonate, barium carbonate, lithium carbonate, magnesium hydroxide, aluminum hydroxide, zinc hydroxide, boehmite, white carbon, zirconium oxide hydrate, magnesium oxide hydrate, magnesium hydroxide octahydrate, boron carbide, silicon nitride, boron nitride, aluminum nitride, titanium nitride, lithium fluoride, aluminum fluoride, calcium fluoride, barium fluoride, magnesium fluoride, trilithium phosphate, magnesium phosphate, magnesium hydrogen phosphate, ammonium polyphosphate, a silicate mineral, a carbonate mineral, and an oxide mineral, and
the organic particles are particles of at least one selected from the group consisting of melamine, melamine cyanurate, melamine polyphosphate, cross-linked polymethyl methacrylate, polyethylene, polypropylene, polystyrene, polytetrafluoroethylene, polyvinylidene difluoride, a polyamide, a polyimide, a melamine resin, a phenol resin, and an epoxy resin.

[7]
The battery according to [6], wherein
the silicate mineral is at least one selected from the group consisting of talc, calcium silicate, zinc silicate, zirconium silicate, aluminum silicate, magnesium silicate, kaolinite, sepiolite, imogolite, sericite, pyrophyllite, a mica, a zeolite, mullite, saponite, attapulgite, and montmorillonite,
the carbonate mineral is at least one selected from the group consisting of hydrotalcite and dolomite, and
the oxide mineral is spinel.

[8]
The battery according to any of [1] to [7], wherein
the matrix polymer compound is at least one selected from the group consisting of polyvinylidene difluoride, polytetrafluoroethylene, a vinylidene fluoride-tetrafluoroethylene copolymer, an ethylene-tetrafluoroethylene copolymer, a vinylidene fluoride-tetrafluoroethylene copolymer, an ethylene-tetrafluoroethylene copolymer, a styrene-butadiene copolymer and a hydride thereof, an acrylonitrile-butadiene copolymer and a hydride thereof, an acrylonitrile-butadiene-styrene copolymer and a hydride thereof, a methacrylic acid ester-acrylic acid ester copolymer, a styrene-acrylic acid ester copolymer, an acrylonitrile-acrylic acid ester copolymer, ethylene-propylene rubber, polyvinyl alcohol, polyvinyl acetate, ethyl cellulose, a cellulose derivative, polyphenylene ether, a polysulfone, a polyethersulfone, polyphenylene sulfide, a polyetherimide, a polyimide, a polyamide, a polyamide-imide, polyacrylonitrile, polyvinyl alcohol, a polyether, an acrylic acid resin, a polyester, and polyethylene glycol.

[9]
The battery according to any of [1] to [8], wherein
the particle size D50, a particle size D40, and a particle size D60 of the particle are not less than 50 nm and not more than 450 nm, or not more than 750 nm and not more than 10,000 nm.

[10]

The battery according to any of [1] to [9], wherein the amount of the particles contained is not less than 5.2 mass % and not more than 50.0 mass % relative to a mass of the electrolyte.

[11]

The battery according to any of [1] to [10], wherein at least one of the amount of the matrix polymer compound contained and the amount of the electrolyte salt contained is not less than 5.6 mass % and not more than 30.8 mass % relative to a mass of the electrolyte.

[12]

The battery according to any of [1] to [11], wherein the particle is a plate-like particle with a thickness of not less than 50 nm and not more than 450 nm or a needle-like particle with a thickness of not less than 50 nm and not more than 450 nm.

[13]

The battery according to any of [2] to [12], wherein a thickness of the gel electrolyte layer is not less than 1 μm and not more than 15 μm.

[14]

An electrolyte including:

particles;

an electrolyte solution containing a solvent and an electrolyte salt; and a matrix polymer compound, wherein a particle size D50 of the particle is not less than 50 nm and not more than 450 nm, or not less than 750 nm and not more than 10,000 nm, a refractive index of the particle is not less than 1.3 and less than 2.4, and one of a mass ratio between the particles and the matrix polymer compound (particles/matrix polymer compound) and a mass ratio between the particles and the electrolyte salt (particles/electrolyte salt) is not less than 15/85 and not more than 90/10.

[15]

A battery pack including:

the battery according to any of [1] to [13];

a controller configured to control the battery; and a package housing the battery.

[16]

An electronic device including the battery according to any of [1] to [13] and configured to be supplied with power from the battery.

[17]

An electric vehicle including:

the battery according to any of [1] to [13];

a conversion device configured to be supplied with power from the battery and convert the power to driving force of the vehicle; and a control device configured to perform information processing about vehicle control based on information about the battery.

[18]

A power storage device including the battery according to [1] and configured to supply power to an electronic device connected to the battery.

[19]

The power storage device according to [18], including:

a power information control device configured to transmit/receive a signal to/from another device via a network, wherein the power storage device controls charge/discharge of the battery based on information received by the power information control device.

[20]

A power system configured to be supplied with power from the battery according to any of [1] to [13] or allow the battery to be supplied with power from a power generation device or a power network.

REFERENCE SIGNS LIST 50 wound electrode body
51 positive electrode lead
52 negative electrode lead
53 positive electrode
53A positive electrode current collector
53B positive electrode active material layer
54 negative electrode
54A negative electrode current collector
54B negative electrode active material layer
55 separator
56 gel electrolyte layer
57 protection tape
60 package member
61 adhesive film
70 stacked electrode body
71 positive electrode lead
72 negative electrode lead
73 positive electrode
74 negative electrode
75 separator
76 fixing member
101 battery cell
101a terrace portion
102a, 102b lead
103a to 103c insulating tape
104 insulating plate
105 circuit substrate
106 connector
301 assembled battery
301a secondary battery
302a charge control switch
302b diode
303a discharge control switch
303b diode
304 switch part
307 current sensing resistor
308 temperature sensing element
310 controller
311 voltage sensing part
313 current measuring part
314 switch controller
317 memory
318 temperature sensing part
321 positive electrode terminal
322 negative electrode terminal
400 power storage system
401 house
402 concentrated power system
402a thermal power generation
402b nuclear power generation
402c hydroelectric power generation
403 power storage device
404 power generation device
405 power consumption device
405a refrigerator
405b air conditioner
405c television receiver
405d bath
406 electric vehicle 406a electric car
406b hybrid car
406c electric motorcycle
407 smart meter
408 power hub
409 power network
410 control device
411 sensor
412 information network
413 server
500 hybrid vehicle
501 engine
502 power generator
503 electric power/driving force conversion device
504a driving wheel
504b driving wheel
505a wheel
505b wheel
508 battery
509 vehicle control device
510 sensor
511 charging inlet

The invention claimed is:

1. A battery comprising:
a positive electrode;
a negative electrode;
a separator; and
an electrolyte containing particles, an electrolyte solution containing a solvent and an electrolyte salt, and a matrix polymer compound,
wherein a particle size D50 of each particle is not less than 50 nm and not more than 450 nm, or not less than 750 nm and not more than 10,000 nm,
a refractive index of each particle is not less than 1.3 and less than 2.4, and
a mass ratio between the particles and the matrix polymer compound (particles/matrix polymer compound) is not less than 15/85 and not more than 90/10.

2. The battery according to claim 1, wherein
the electrolyte in a gel form in which the matrix polymer compound is impregnated with the electrolyte solution and the matrix polymer compound is swollen is formed on both surfaces of at least one of the positive electrode and the negative electrode or on at least one of both surfaces of the separator.

3. The battery according to claim 1, wherein
both of the mass ratio (particles/matrix polymer compound) and a mass ratio between the particles and the electrolyte salt (particles/electrolyte salt) are not less than 15/85 and not more than 90/10.

4. The battery according to claim 1, wherein
the electrolyte is transparent.

5. The battery according to claim 1, wherein
the particles are at least one of inorganic particles and organic particles.

6. The battery according to claim 5, wherein
the inorganic particles are particles of at least one selected from the group consisting of silicon oxide, zinc oxide, tin oxide, magnesium oxide, antimony oxide, aluminum oxide, magnesium sulfate, calcium sulfate, barium sulfate, strontium sulfate, magnesium carbonate, calcium carbonate, barium carbonate, lithium carbonate, magnesium hydroxide, aluminum hydroxide, zinc hydroxide, boehmite, white carbon, zirconium oxide hydrate, magnesium oxide hydrate, magnesium hydroxide octahydrate, boron carbide, silicon nitride, boron nitride, aluminum nitride, titanium nitride, lithium fluoride, aluminum fluoride, calcium fluoride, barium fluoride, magnesium fluoride, trilithium phosphate, magnesium phosphate, magnesium hydrogen phosphate, ammonium polyphosphate, a silicate mineral, a carbonate mineral, and an oxide mineral, and
the organic particles are particles of at least one selected from the group consisting of melamine, melamine cyanurate, melamine polyphosphate, cross-linked polymethyl methacrylate, polyethylene, polypropylene, polystyrene, polytetrafluoroethylene, polyvinylidene difluoride, a polyamide, a polyimide, a melamine resin, a phenol resin, and an epoxy resin.

7. The battery according to claim 6, wherein
the silicate mineral is at least one selected from the group consisting of talc, calcium silicate, zinc silicate, zirconium silicate, aluminum silicate, magnesium silicate, kaolinite, sepiolite, imogolite, sericite, pyrophyllite, a mica, a zeolite, mullite, saponite, attapulgite, and montmorillonite,
the carbonate mineral is at least one selected from the group consisting of hydrotalcite and dolomite, and
the oxide mineral is spinel.

8. The battery according to claim 1, wherein
the matrix polymer compound is at least one selected from the group consisting of polyvinylidene difluoride, polytetrafluoroethylene, a vinylidene fluoride-tetrafluoroethylene copolymer, an ethylene-tetrafluoroethylene copolymer, a styrene-butadiene copolymer and a hydride thereof, an acrylonitrile-butadiene copolymer and a hydride thereof, an acrylonitrile-butadiene-styrene copolymer and a hydride thereof, a methacrylic acid ester-acrylic acid ester copolymer, a styrene-acrylic acid ester copolymer, an acrylonitrile-acrylic acid ester copolymer, ethylene-propylene rubber, polyvinyl alcohol, polyvinyl acetate, ethyl cellulose, a cellulose derivative, polyphenylene ether, a polysulfone, a polyethersulfone, polyphenylene sulfide, a polyetherimide, a polyimide, a polyamide, a polyamide-imide, polyacrylonitrile, a polyether, an acrylic acid resin, a polyester, and polyethylene glycol.

9. The battery according to claim 1, wherein
the particle size D50, a particle size D40, and a particle size D60 of the particle are not less than 50 nm and not more than 450 nm, or not less than 750 nm and not more than 10,000 nm.

10. The battery according to claim 1, wherein
the amount of the particles contained is not less than 5.2 mass % and not more than 50.0 mass % relative to a mass of the electrolyte.

11. The battery according to claim 1, wherein
at least one of the amount of the matrix polymer compound contained and the amount of the electrolyte salt contained is not less than 5.6 mass % and not more than 30.8 mass % relative to a mass of the electrolyte.

12. The battery according to claim 1, wherein
the particle is a plate-like particle with a thickness of not less than 50 nm and not more than 450 nm or a needle-like particle with a thickness of not less than 50 nm and not more than 450 nm.

13. The battery according to claim 2, wherein
a thickness of the gel electrolyte layer is not less than 1 μm and not more than 15 μm.

14. An electrolyte comprising:
particles;
an electrolyte solution containing a solvent and an electrolyte salt; and
a matrix polymer compound, wherein a particle size D50 of each particle is not less than 50 nm and not more than 450 nm, or not less than 750 nm and not more than 10,000 nm, a refractive index of each particle is not less than 1.3 and less than 2.4, and a mass ratio between the particles and the matrix polymer compound (particles/matrix polymer compound) is not less than 15/85 and not more than 90/10.

15. A battery pack comprising:
the battery according to claim 1;
a controller configured to control the battery; and
a package housing the battery.

16. An electronic device comprising the battery according to claim 1 and configured to be supplied with power from the battery.

17. An electric vehicle comprising:
the battery according to claim 1;
a conversion device configured to be supplied with power from the battery and convert the power to driving force of the vehicle; and
a control device configured to perform information processing about vehicle control based on information about the battery.

18. A power storage device comprising the battery according to claim 1 and configured to supply power to an electronic device connected to the battery.

19. The power storage device according to claim 18, comprising:
a power information control device configured to transmit/receive a signal to/from another device via a network,
wherein the power storage device controls charge/discharge of the battery based on information received by the power information control device.

20. A power system configured to be supplied with power from the battery according to claim 1 or allow the battery to be supplied with power from a power generation device or a power network.

21. The battery according to claim 1, wherein the solvent is selected from the group consisting of a lactone-based solvent, a carbonate-based solvent, an ether-based solvent, a nitrile-based solvent, a sulfolane-based solvent, a phosphoric acid, a phosphate solvent, a pyrrolidone, and mixtures thereof.

22. The electrolyte according to claim 14, wherein the solvent is selected from the group consisting of a lactone-based solvent, a carbonate-based solvent, an ether-based solvent, a nitrile-based solvent, a sulfolane-based solvent, a phosphoric acid, a phosphate solvent, a pyrrolidone, and mixtures thereof.

* * * * *